(12) United States Patent
Shet

(10) Patent No.: US 9,497,828 B2
(45) Date of Patent: Nov. 15, 2016

(54) TWO-WIRE FLYBACK DIMMER AND A METOD OF OPERATION THEREOF

(71) Applicant: KONINKLIJKE PHILIPS N.V., Eindhoven (NL)

(72) Inventor: Deepak Shivaram Shet, Hoffman Estates, IL (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 17 days.

(21) Appl. No.: 14/385,280

(22) PCT Filed: Mar. 6, 2013

(86) PCT No.: PCT/IB2013/051780
§ 371 (c)(1),
(2) Date: Sep. 15, 2014

(87) PCT Pub. No.: WO2013/140287
PCT Pub. Date: Sep. 26, 2013

(65) Prior Publication Data
US 2015/0062975 A1 Mar. 5, 2015

Related U.S. Application Data

(60) Provisional application No. 61/613,162, filed on Mar. 20, 2012.

(51) Int. Cl.
*H02M 3/335* (2006.01)
*H05B 37/02* (2006.01)
*H02M 5/257* (2006.01)
(Continued)

(52) U.S. Cl.
CPC ......... *H05B 37/02* (2013.01); *H02M 3/33523* (2013.01); *H02M 3/33569* (2013.01); *H02M 5/2573* (2013.01); *H02M 5/293* (2013.01); *H02M 2001/0006* (2013.01); *H05B 33/0815* (2013.01); *H05B 39/044* (2013.01)

(58) Field of Classification Search
CPC ............................................. H02M 2001/0006
USPC ............ 363/15–19, 21.12–21.17, 39, 44, 49, 363/56, 123, 140
See application file for complete search history.

(56) References Cited

U.S. PATENT DOCUMENTS

| 5,742,105 A | 4/1998 | Lech |
| 5,811,963 A | 9/1998 | Elwell |
| 6,262,565 B1 | 7/2001 | Williams |

(Continued)

FOREIGN PATENT DOCUMENTS

EP 0822645 A2 2/1998

*Primary Examiner* — Adolf Berhane
*Assistant Examiner* — Nusrat Quddus

(57) ABSTRACT

A low-voltage power supply apparatus (900A) providing power to an neutral-less two-wire electronically controlled switch, including a first power supply (901) having a first DC bus (910+, 910−) electronically coupled to a rectifier bridge (906) and a first flyback converter (991). The rectifier bridge receives an AC signal from an AC source and provides a first DC voltage at the first DC bus, the first flyback converter receives the DC voltage and outputs a first low-voltage signal (Vout). A second power supply (905) having a second DC bus (909+, 909−) is electronically coupled to a controllable rectifier bridge (966) and a second flyback converter (971). The controllable rectifier bridge receives the AC signal from the AC source and provides a second DC voltage at the second DC bus. The second flyback converter receives the second DC voltage and outputs a second low-voltage signal (Vout).

14 Claims, 32 Drawing Sheets

(51) Int. Cl.
*H02M 5/293* (2006.01)
*H02M 1/00* (2006.01)
*H05B 33/08* (2006.01)
*H05B 39/04* (2006.01)

(56) References Cited

U.S. PATENT DOCUMENTS

| | | | |
|---|---|---|---|
| 7,391,168 B1* | 6/2008 | Dernovsek | H02J 13/0051 |
| | | | 315/291 |
| 7,394,204 B1* | 7/2008 | Shet | H05B 37/0263 |
| | | | 315/194 |
| 7,423,413 B2 | 9/2008 | Dobbins | |
| 7,564,227 B2 | 7/2009 | Dobbins | |
| 7,728,564 B2 | 6/2010 | Fricke | |
| 8,193,789 B2* | 6/2012 | Bayat | F21L 4/027 |
| | | | 315/299 |
| 2002/0067138 A1 | 6/2002 | Birrell | |
| 2010/0270982 A1 | 10/2010 | Hausman | |
| 2010/0327759 A1* | 12/2010 | Zwerver | H05B 41/295 |
| | | | 315/210 |
| 2011/0080112 A1* | 4/2011 | Shearer | H05B 33/0815 |
| | | | 315/291 |
| 2012/0025802 A1 | 2/2012 | Carmen | |

* cited by examiner

500A
V switch
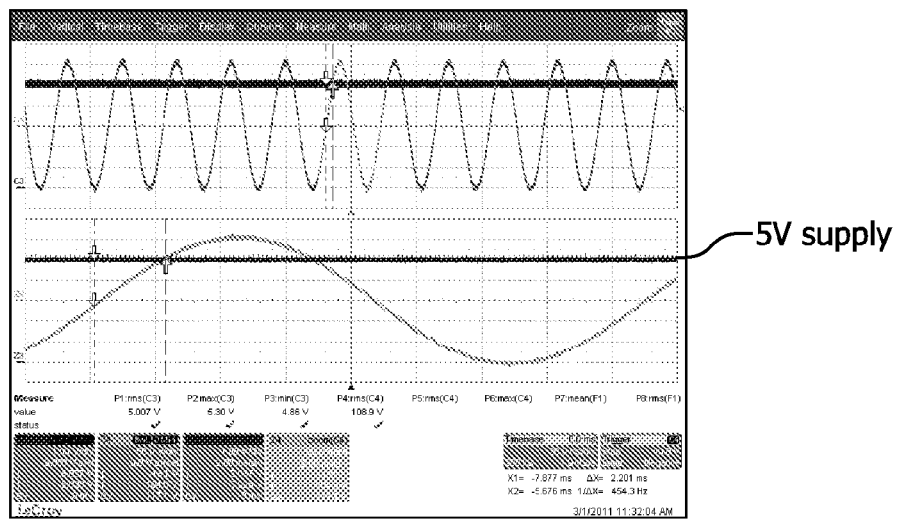
5V supply
500B
V switch
V switch
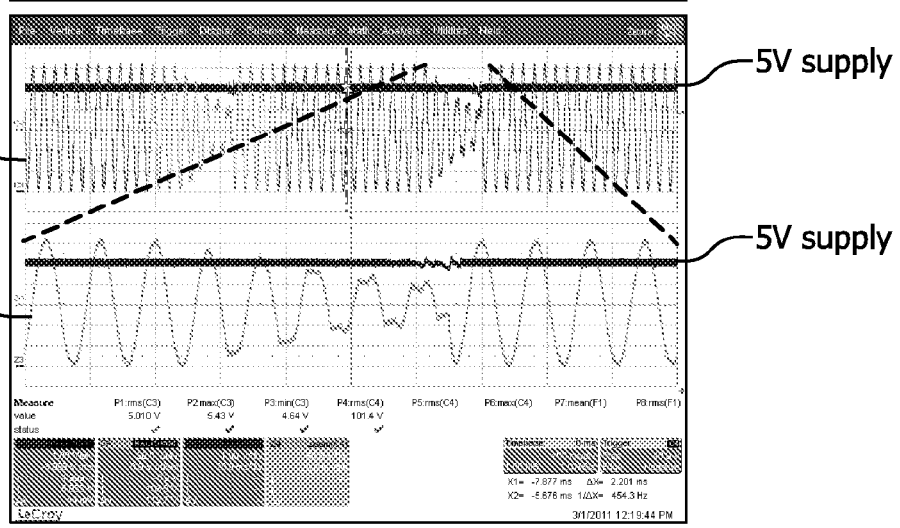
5V supply
5V supply
500C
V switch
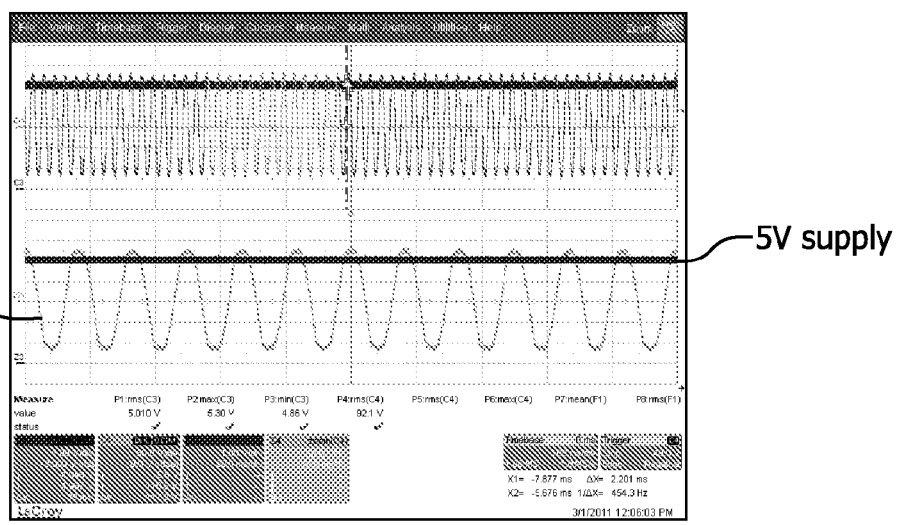
5V supply
FIG. 5A

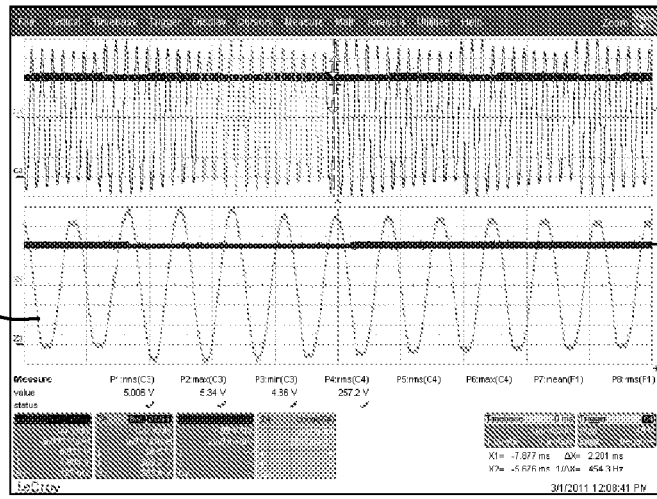
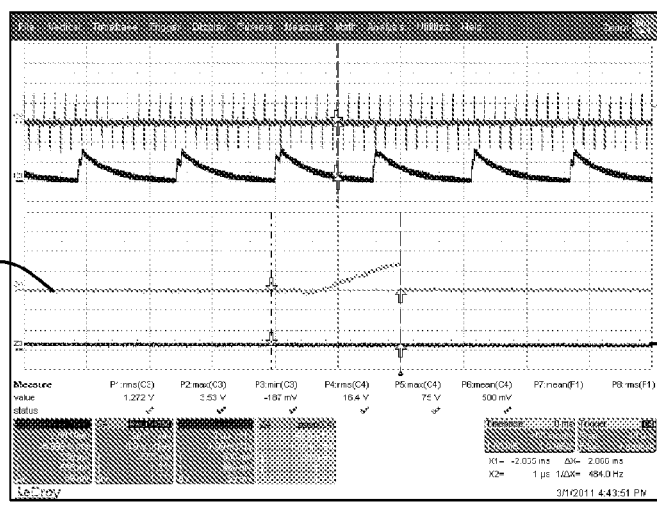
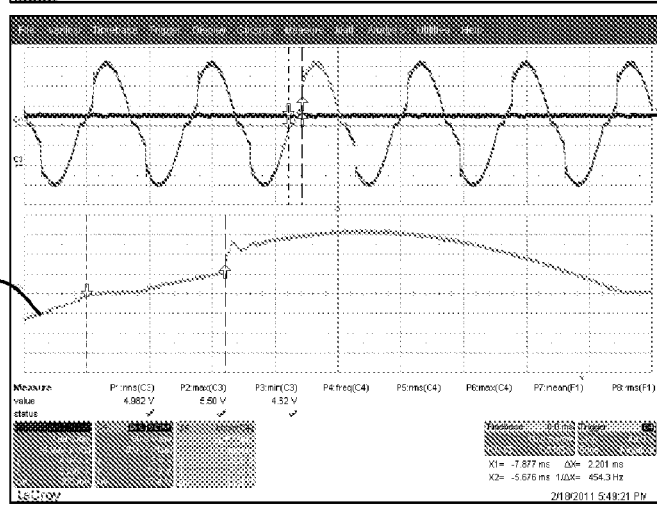
FIG. 5B

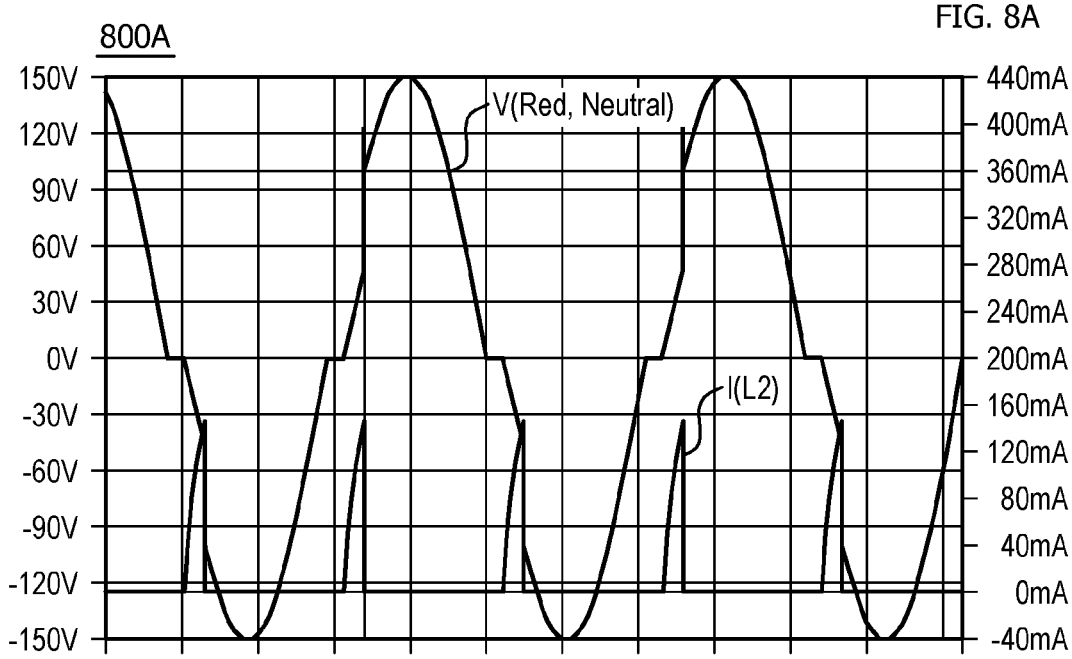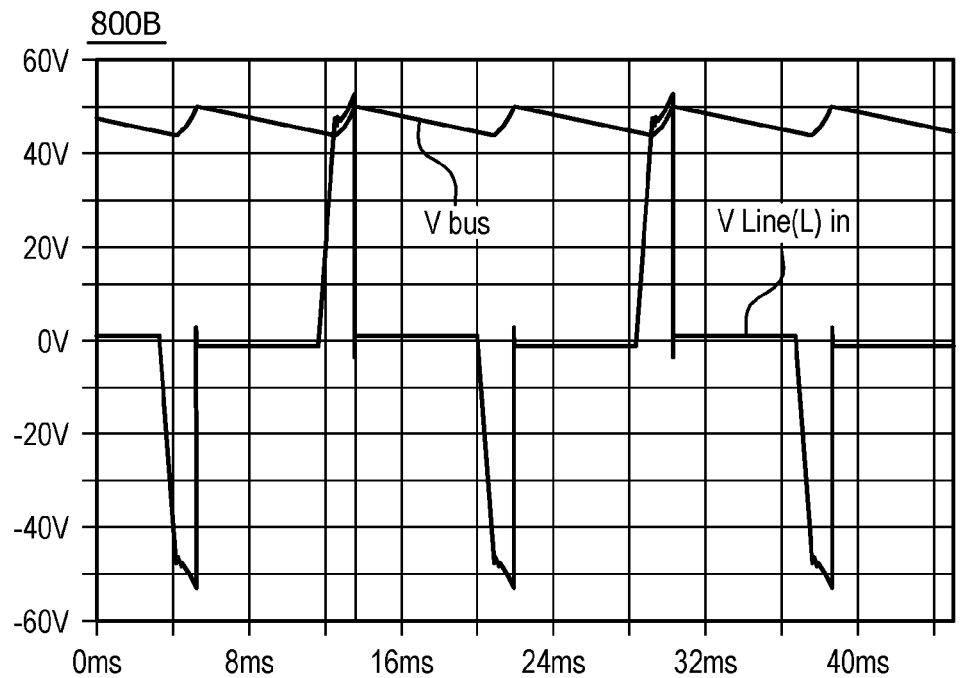
w/o Boost
FIG. 8A-I

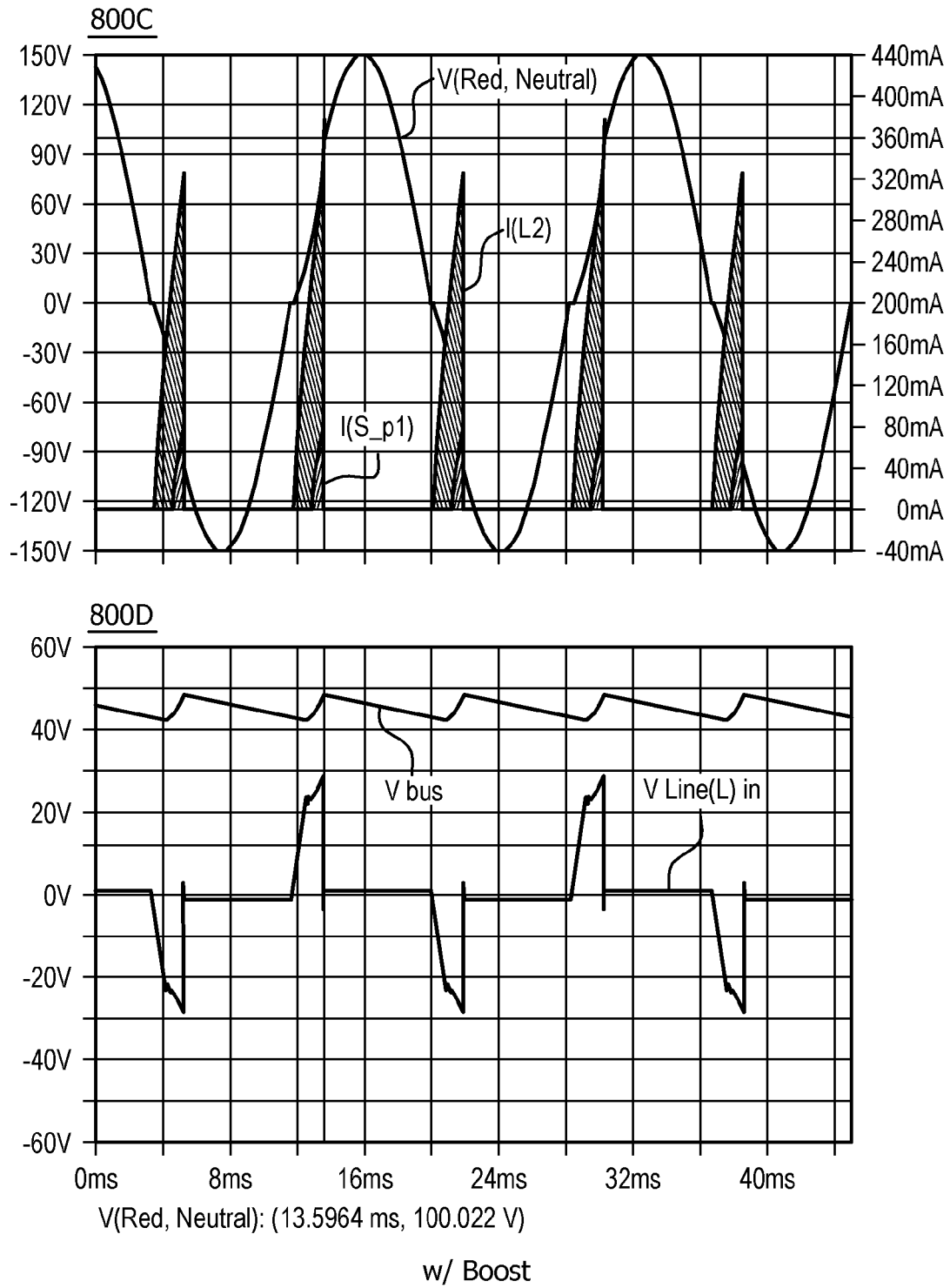
FIG. 8A-II

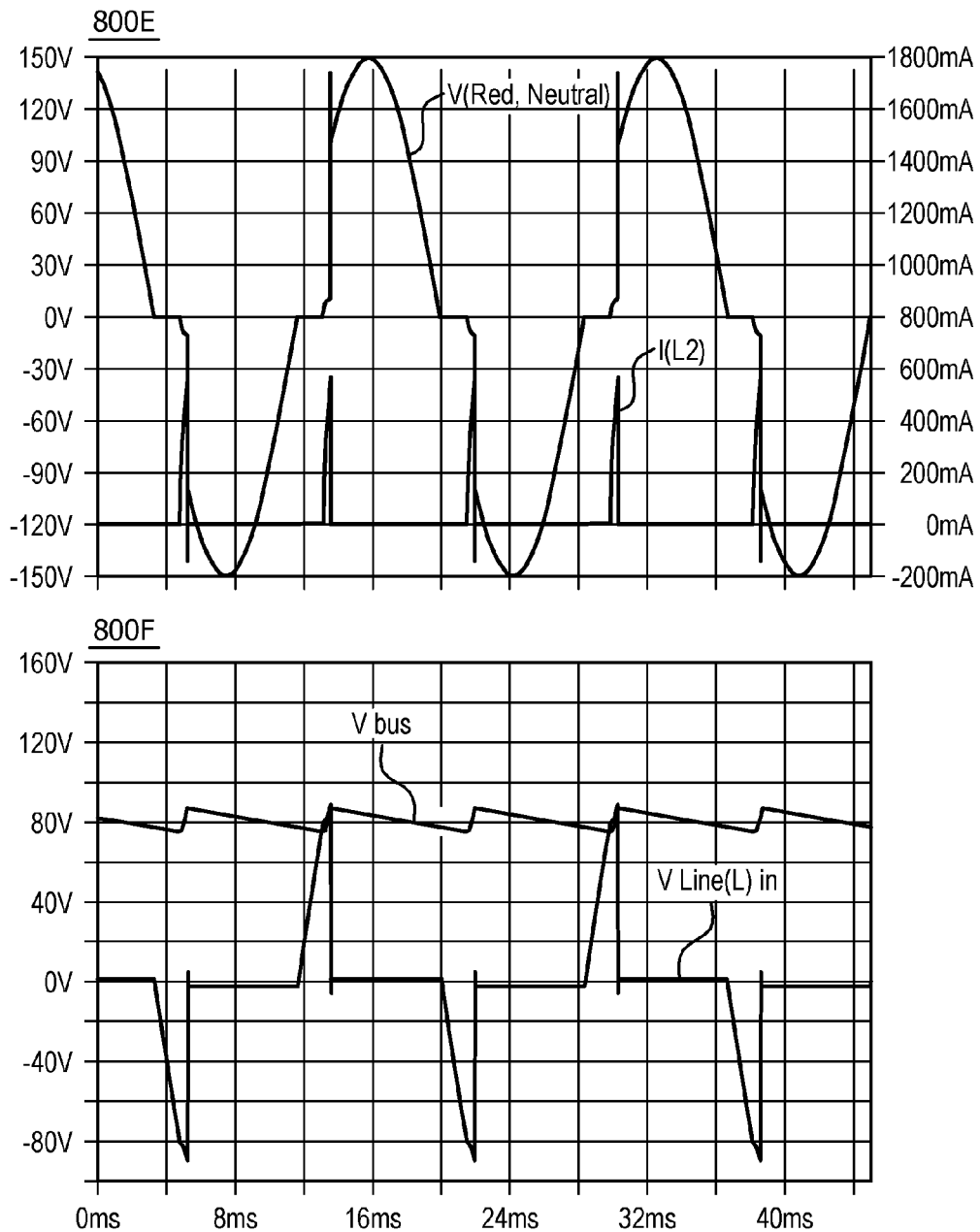
FIG. 8B-I

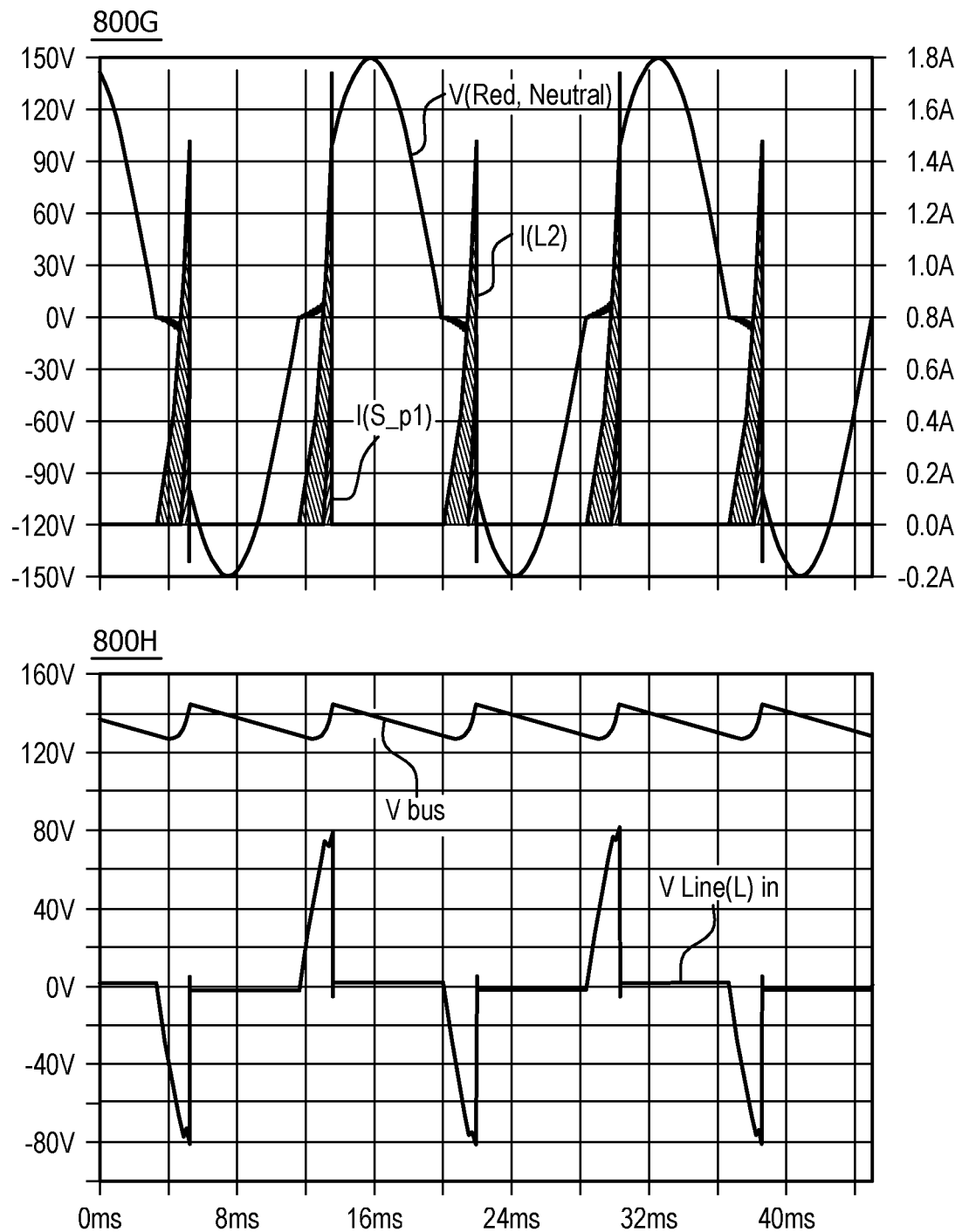
FIG. 8B-II

1000B

1200A
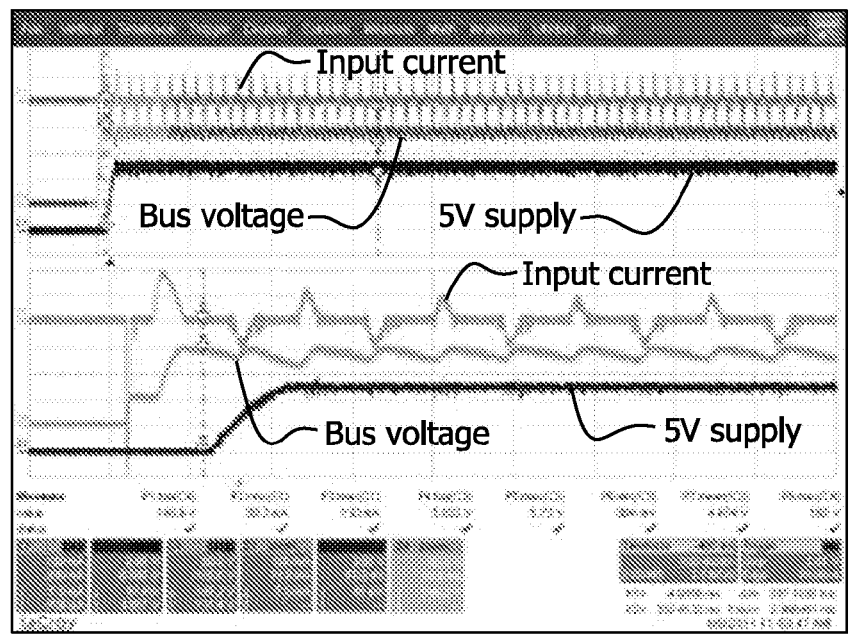
Ch 1 = Input current
Ch 3 = Bus voltage
Ch 4 = 5V supply
1200B
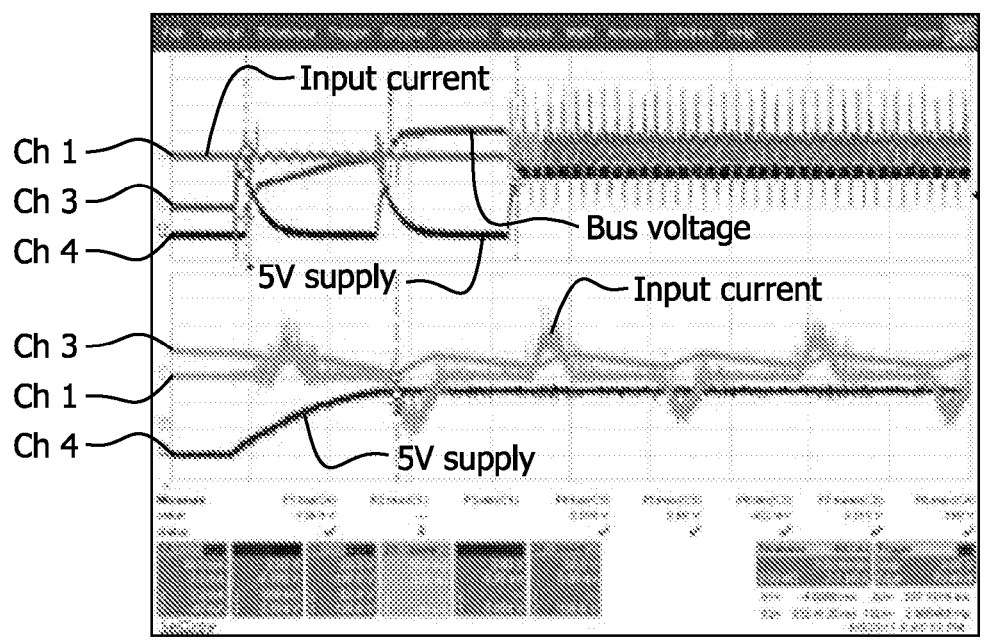
FIG. 12A

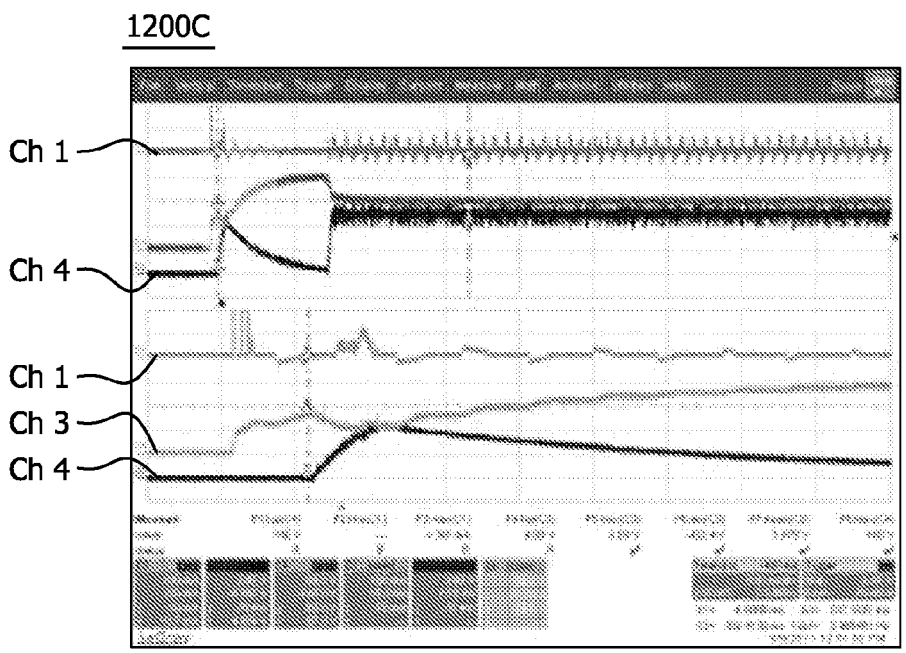
Ch 1 = Input current
Ch 3 = Bus voltage
Ch 4 = 5V supply
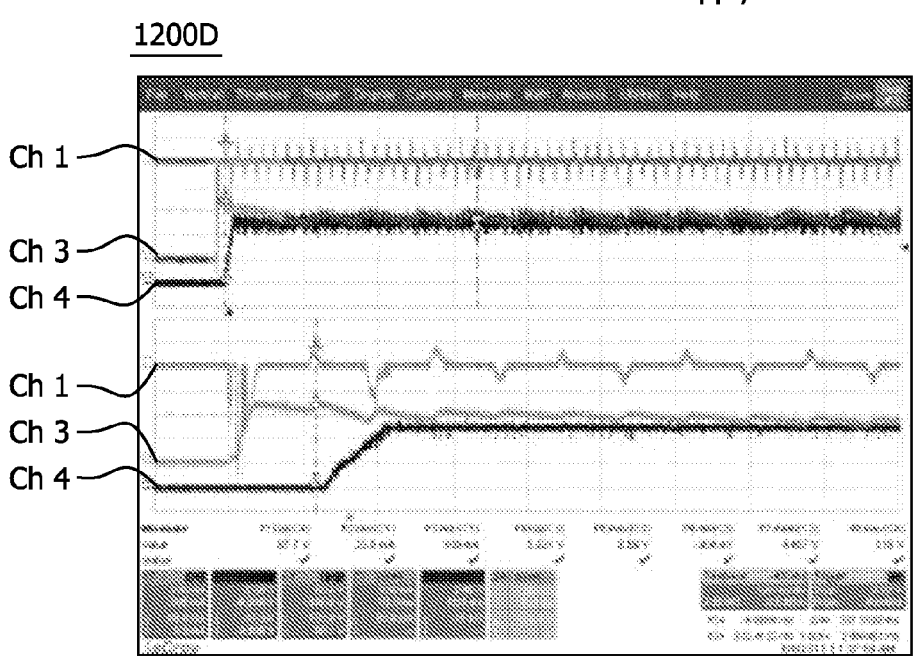
FIG. 12B

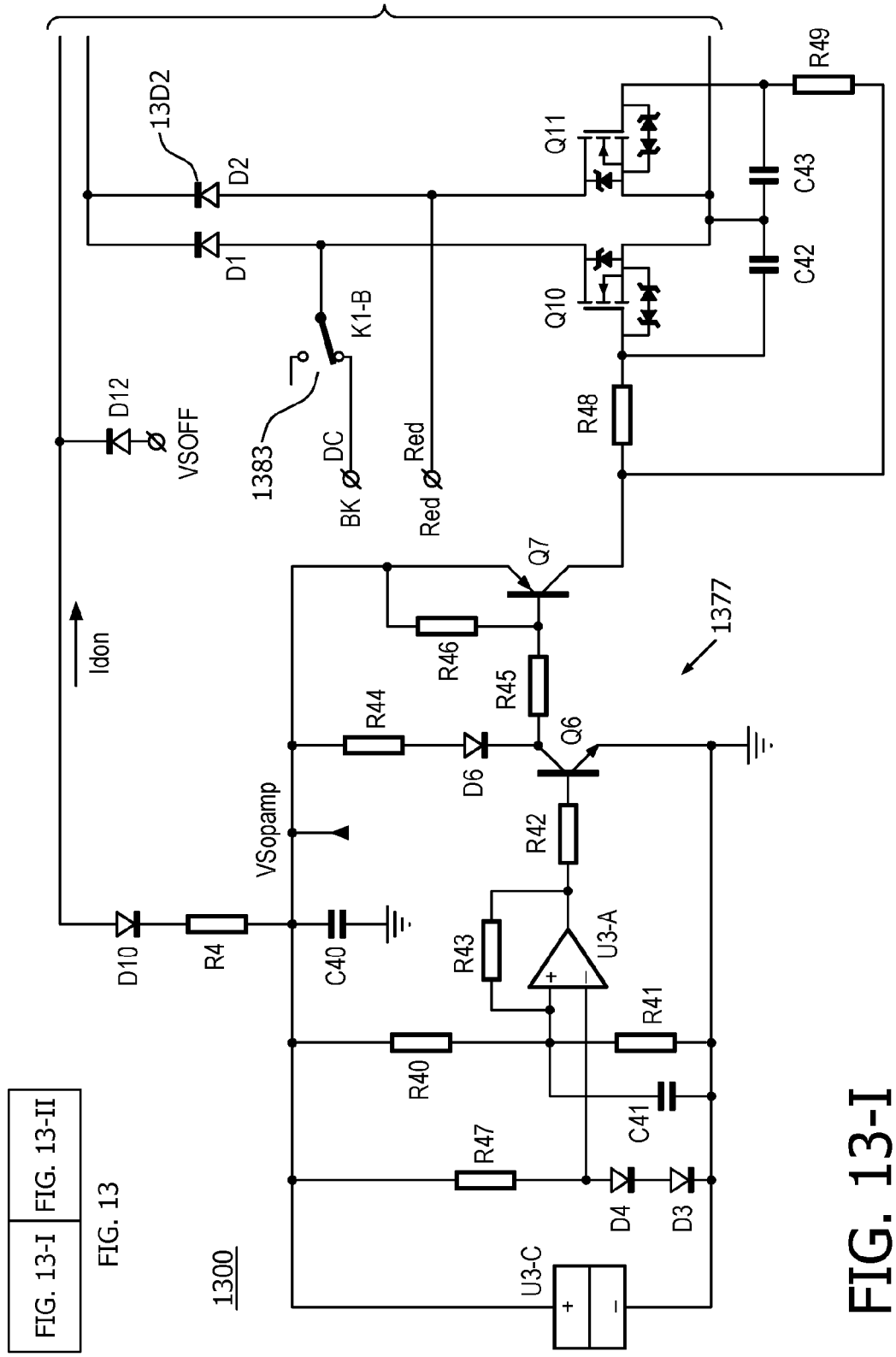
FIG. 13-I

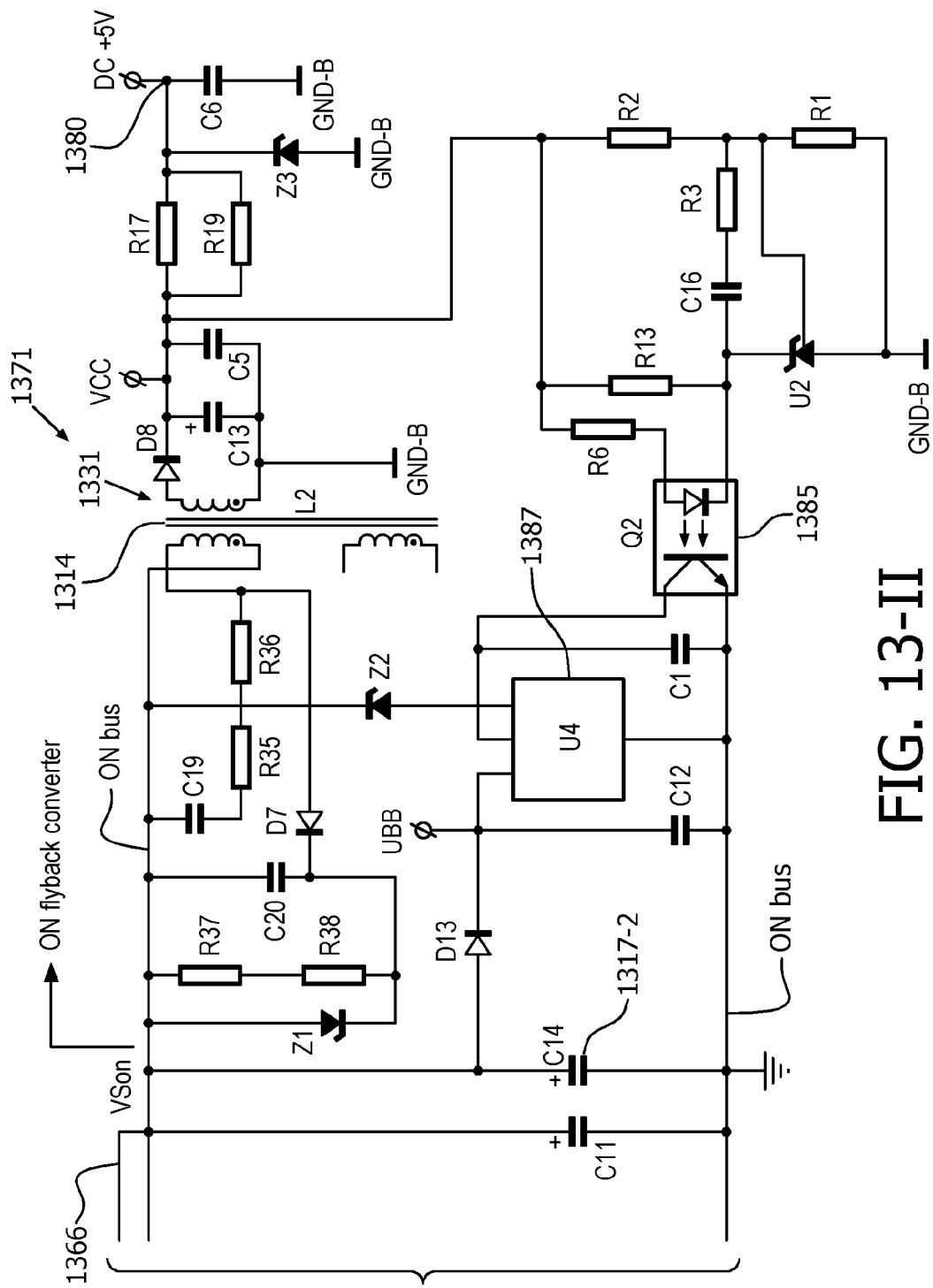
FIG. 13-II

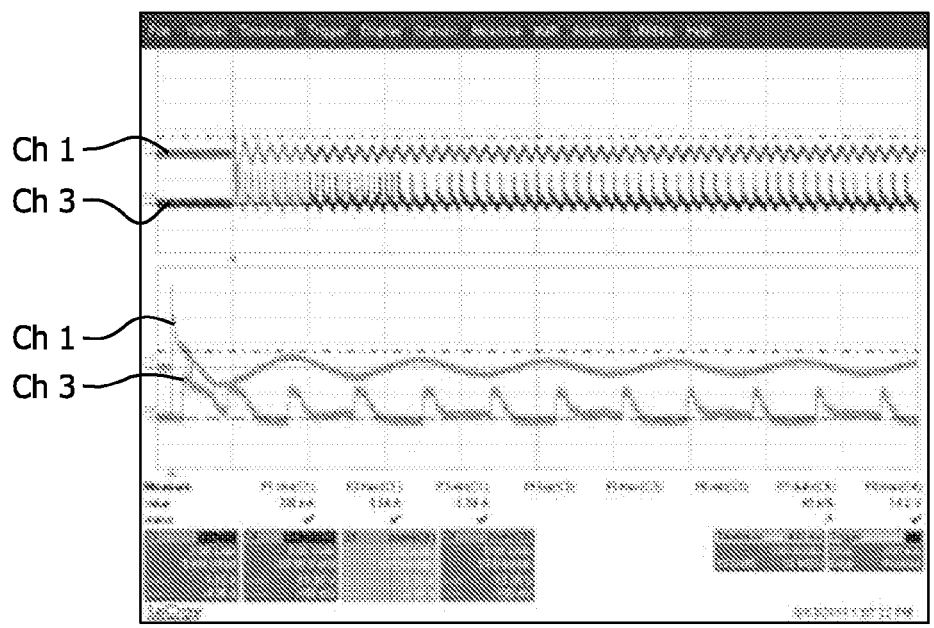
Ch 1 = Input current
Ch 3 = MOSFET gate voltage
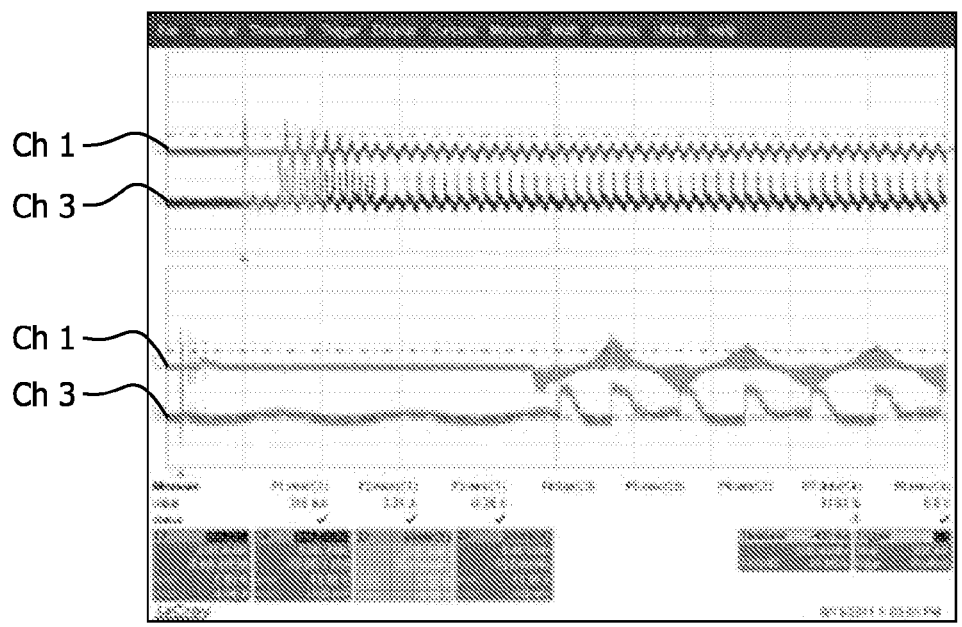
FIG. 14A

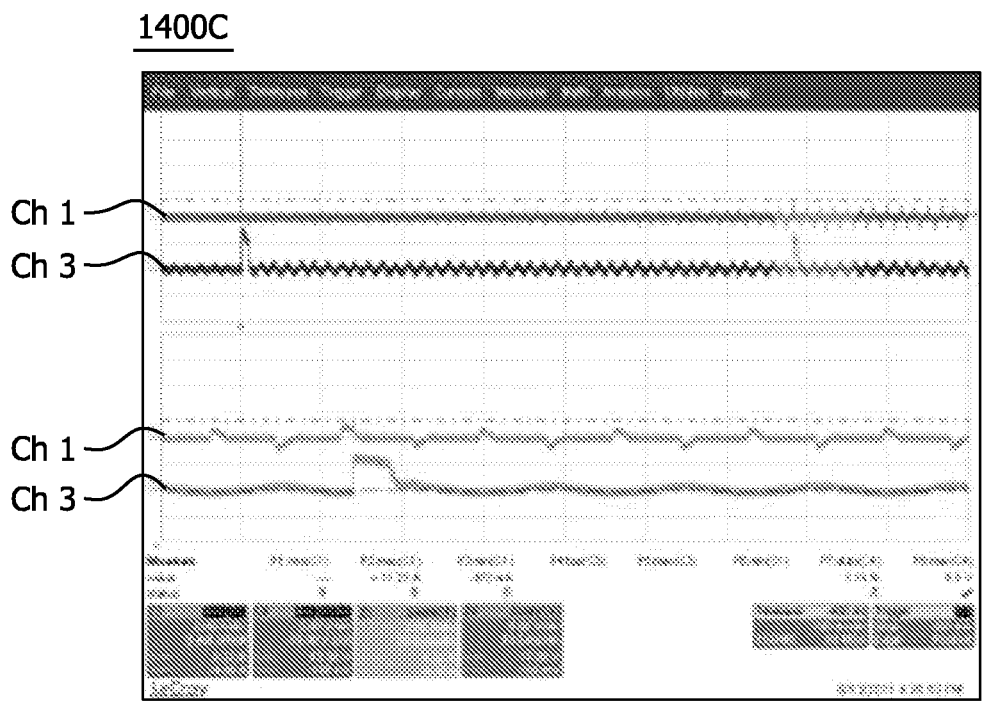
Ch 1 = Input current
Ch 3 = MOSFET gate voltage
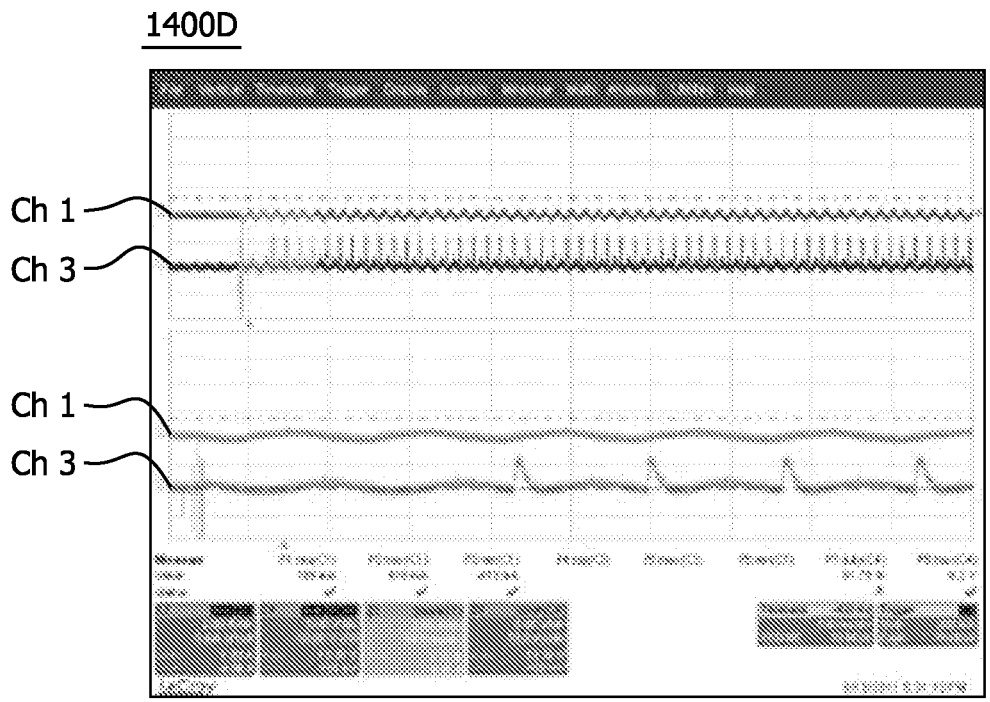
FIG. 14B

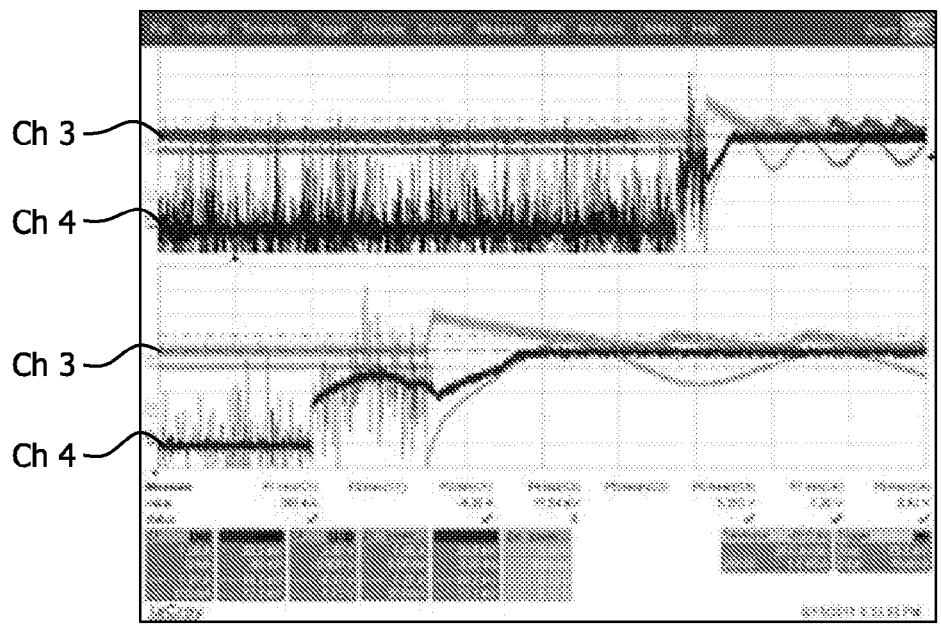
Ch 1 = Input current
Ch 3 = 5V supply
Ch 4 = Relay CCDD signal
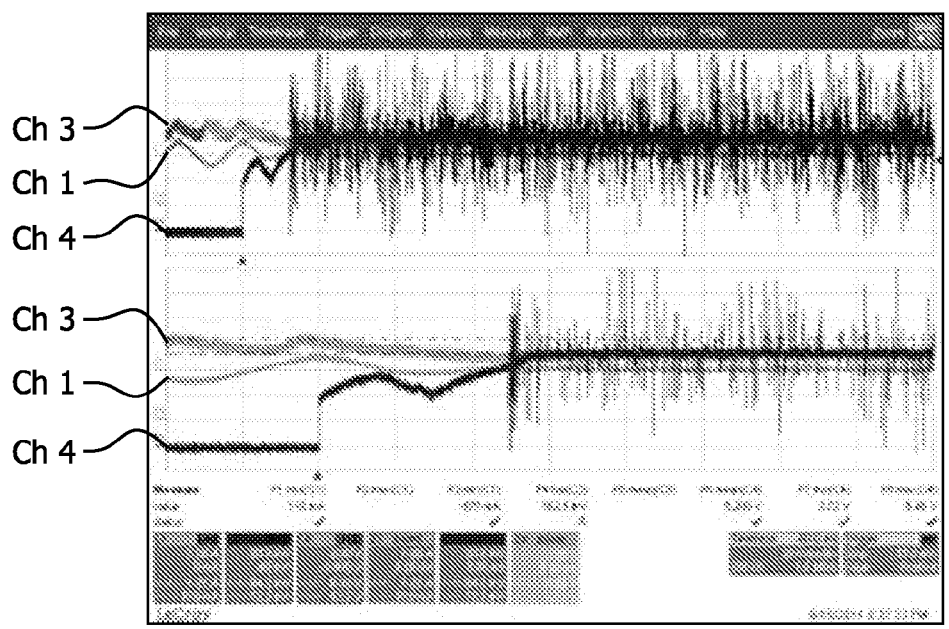
FIG. 15

TWO-WIRE FLYBACK DIMMER AND A METOD OF OPERATION THEREOF

CROSS-REFERENCE TO PRIOR APPLICATIONS

This application is the U.S. National Phase application under 35 U.S.C. §371 of International Application No. PCT/IB2013/051780, filed on Mar. 6, 2013, which claims the benefit of U.S. Provisional Patent Application No. 61/613,162, filed on Mar. 20, 2012. These applications are hereby incorporated by reference herein.

The present system relates to a two wire digital dimmer apparatus and, more particularly, to a digital dimmer which is suitable for operation in circuits which do not have a neutral wire, and a method of operation thereof.

Typically, electronic control switches (ECS) such as switches and/or dimmers (hereinafter both of which will be commonly referred to as dimmers for the sake of clarity unless the context indicates otherwise) require a low-voltage power supply to supply low-voltage power to operate their internal low-voltage circuits such as controllers, wireless transceivers, sensors, etc. With line ((L) or black) and neutral ((N) or white) connections available, it is easy to generate the low-voltage power using "offline" power-supply (PS) integrated-circuits (ICs) that are commercially available at low cost and which may be integrated into the dimmer. However, these "offline" PS ICs require electrical connection to both the line (L) and the neutral (N) conductors (wires) to power their internal circuitry. Accordingly, dimmers using these "offline" PS ICs are typically referred to as three-wire dimmers as they require connection to the line (L), neutral (N), and switched hot (red (R) or switched line) conductors. However, many junction boxes (JBs) for wall switches are designed for single-pole single-throw switches and therefore include a switch loop which only has line (L) and switched hot (R) conductors available. These JBs are commonly known as two-wire JBs and do not have a neutral (N) conductor. Accordingly, three-wire dimmers which require connection to each of the line (L), neutral (N), and switched hot (R) conductors may not be compatible with these JBs unless these JBs are retrofitted with the neutral (N) conductors. Unfortunately, this requires a neutral (N) conductor to be wired into the two-wire JB which can be costly.

Although three-wire dimmers may operate under certain voltage and load conditions without a neutral (N) connection (e.g., as installed in two-wire JBs) as is the case with most mechanical single pole switches or triode for AC (TRIAC)-type dimmers, it is difficult to generate a stable low-voltage power under all operating voltage and/or load conditions (e.g., during ON and OFF states) to operate properly without the neutral (N) connection. Further, when operating three-wire dimmers without a neutral (N) connection, it has been found that the operation is highly dependent on load type. For example, a three-wire dimmer when coupled to only a load (L) and a switched hot (R) conductor, may operate properly driving a resistive load (e.g., an incandescent lamp) however may not operate properly when driving an inductive load (e.g., a compact fluorescent lamp (CFL) or a motor (e.g., a ceiling fan motor)). Although methods of generating low-voltage power for internal circuitry for a two-wire dimmers are disclosed in U.S. Pat. Nos. 7,728,564 B2, 7,564,227, and 7,423,413, the entire contents of each of which are incorporated herein by reference, these two-wire dimmers do not provide isolation which may be desirable from an interference and/or safety standpoint.

In accordance with an aspect of the present system, there is disclosed a system, method, device, computer program, user interface, and/or apparatus (hereinafter each of which will be commonly referred to as a system unless the context indicates otherwise for the sake of clarity) which provides an electronically controlled switch (ECS) apparatus adapted to be coupled to an alternating current (AC) source and to a load so as to control an amount of power delivered from the AC source to the load, the ECS having ON and OFF states and including a first power supply having a first direct current (DC) bus electronically coupled to a rectifier bridge and a first flyback converter, the rectifier bridge is configured to receive an AC signal from the AC source and provide a first DC voltage at the first DC bus, the first flyback converter is configured to receive the DC voltage and output a first low-voltage signal; a second power supply having a second direct current (DC) bus electronically coupled to a controllable rectifier bridge and a second flyback converter, the controllable rectifier bridge is configured to receive the AC signal from the AC source and provide a second DC voltage at the second DC bus, the second flyback converter is configured to receive the second DC voltage and output a second low-voltage signal; and/or a control portion configured to control the first flyback converter to output the first low-voltage signal when the ECS is in the OFF state, and is further configured to control the second flyback converter to output the second low-voltage signal when the ECS is in the ON state.

The switch apparatus may be a "neutral-less" switch (e.g., not having a connection to neutral (N)) and may be coupled to only two external conductors, the two external conductors comprising a line (L) conductor and a switched line (R) conductor. It is also envisioned that the when the ECS is in the OFF state, substantially no AC power is delivered to the load, and when the ECS is in the ON state, the second power supply is controlled by the controller to control the amount of power delivered from the AC source to the load. Further, the controllable rectifier bridge may include a first diode and a first metal-oxide field-effect transistor (MOSFET) connected in a series connection, and a second diode and a second MOSFET connected in a series connection. It is also envisioned that when the ECS is in the ON state, the controller is configured to control one or more of the first and second MOSFETs of the controllable rectifier bridge to conduct. Moreover, the controller may selectively control one or more of the first and second MOSFETS of the controllable rectifier bridge to conduct so as to control an amount of power delivered from the AC source to the load. It is also envisioned that the ECS may be configured to use the first or second low-voltage signals for internal operating power. The ECS may further include a wireless receiver which operates using the first low-voltage signal when the ECS is in an OFF state and the second low-voltage signal when the ECS is in an ON state. The wireless receiver may receive control instructions (e.g., an ON or OFF command, a time input, etc.) and may provide this information to the controller which may configure the first and/or second power supplies accordingly.

In accordance with yet another aspect of the present system, there is disclosed a low-voltage power supply apparatus for providing power to an electronically controlled switch (ECS), the ECS is configured to be coupled to an alternating current (AC) source and to a load so as to control an amount of power delivered from the AC source to the load, ECS having an ON and OFF states, the low-voltage power supply may include: a first power supply having a first direct current (DC) bus electronically coupled to a rectifier bridge and a first flyback converter, the rectifier bridge is configured to receive an AC signal from the AC source and provide a first DC voltage at the first DC bus, the first flyback converter is configured to receive the DC voltage and output a first low-voltage signal; a second power supply having a second direct current (DC) bus electronically is coupled to a controllable rectifier bridge and a second flyback converter, the controllable rectifier bridge is configured to receive the AC signal from the AC source and provide a second DC voltage at the second DC bus, the second flyback converter is configured to receive the second DC voltage and output a second low-voltage signal; and a control portion is configured to control the first flyback converter to output the first low-voltage signal when the ECS is in the OFF state, and further is configured to control the second flyback converter to output the second low-voltage signal when the ECS is in the ON state.

In accordance with yet a further aspect of the present system, there is disclosed an electronically controlled switch (ECS) apparatus adapted to be coupled to an alternating current (AC) source and to a load so as to control an amount of power delivered from the AC source to the load, the ECS having ON and OFF states and may include a power supply having a first direct current (DC) bus electronically coupled to a rectifier bridge and a flyback converter, the rectifier bridge is configured to receive an AC signal from the AC source and provide a DC voltage at the first DC bus, the flyback converter is configured to receive the DC voltage and output a first low-voltage signal, the rectifier bridge having first and second AC terminals and first and second DC terminals, the first AC terminal is coupled to a line (L) output of the AC source and the second AC terminal is coupled to the load; and a controllable bidirectional semiconductor switch (CBSS) coupled between the AC terminals of the rectifier bridge and having a control gate which, when triggered, configures the CBSS to conduct so as to deliver a controlled amount of power from the AC source to the load for a corresponding half-cycle of the AC source, when the ECS is in the ON state. The CBSS may include a triode for alternating current (TRIAC). Further, the ECS may include a controller coupled to the control gate of the CBSS and which triggers the CBSS to conduct when the ECS is in the ON state. Moreover, the power supply may output the low voltage signal when the CBSS is substantially non-conductive. Further, the CBSS may include an internal resistance for example of about 1,000 kilo-ohms when substantially not conducting. However, other resistance values and/or ranges of resistance are also envisioned.

The invention is explained in further detail, and by way of example, with reference to the accompanying drawings wherein:

FIG. 5A shows test results of the ECS of FIG. 2A in accordance with embodiments of the present system;

FIG. 5B shows test results of the ECS of FIG. 2A in accordance with embodiments of the present system;

Figure 9A:
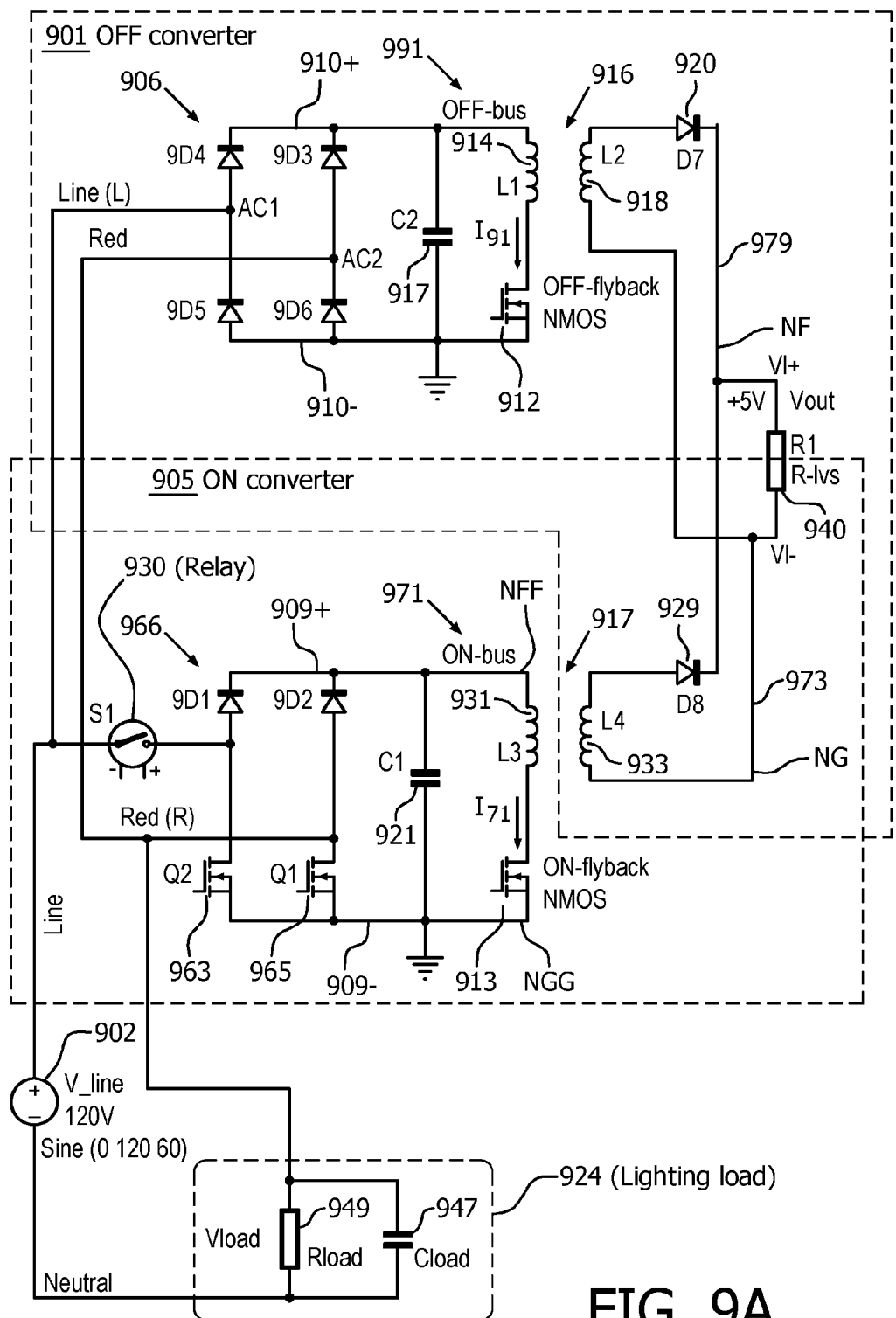
Figure 9B:
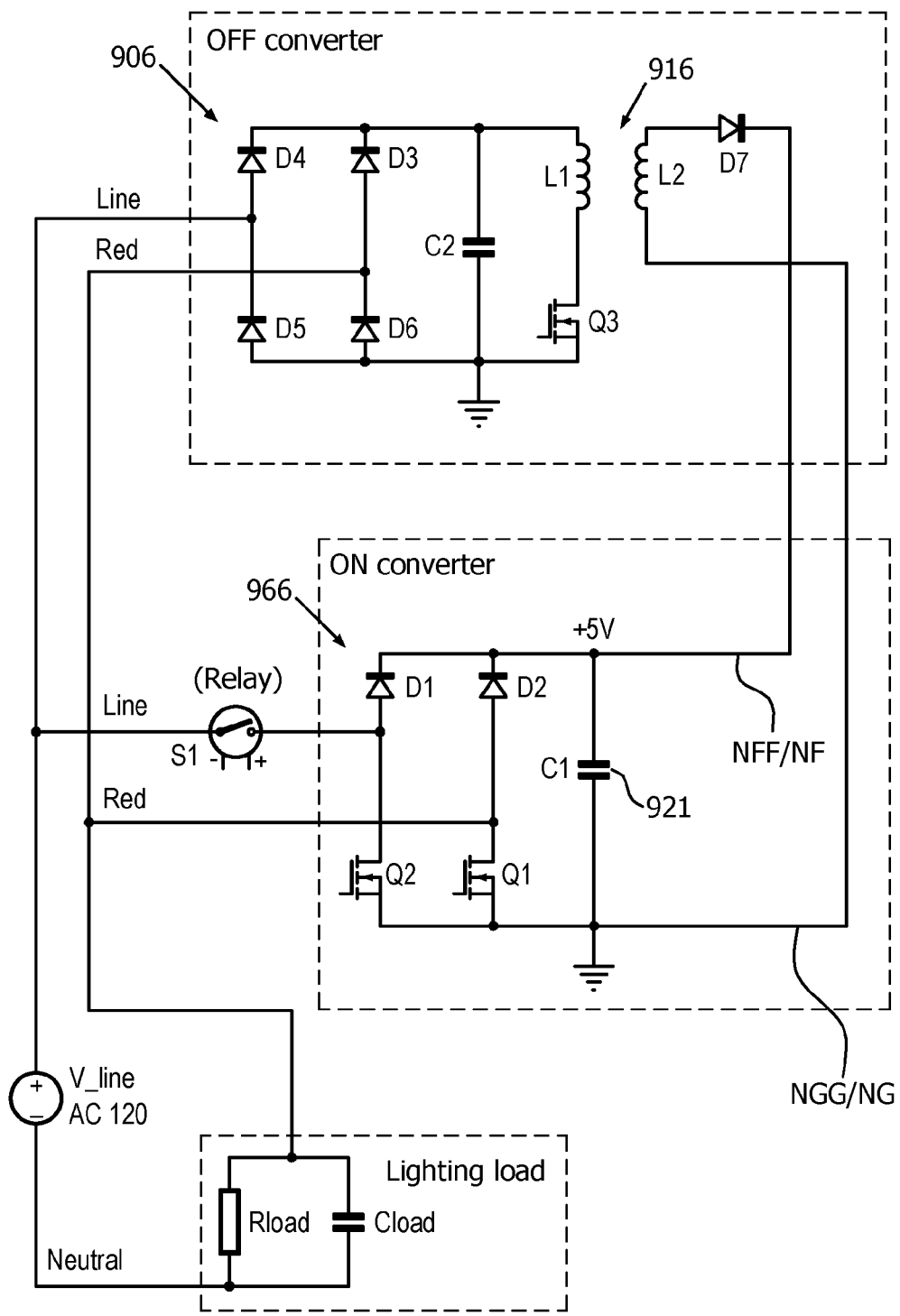
Figure 10A:
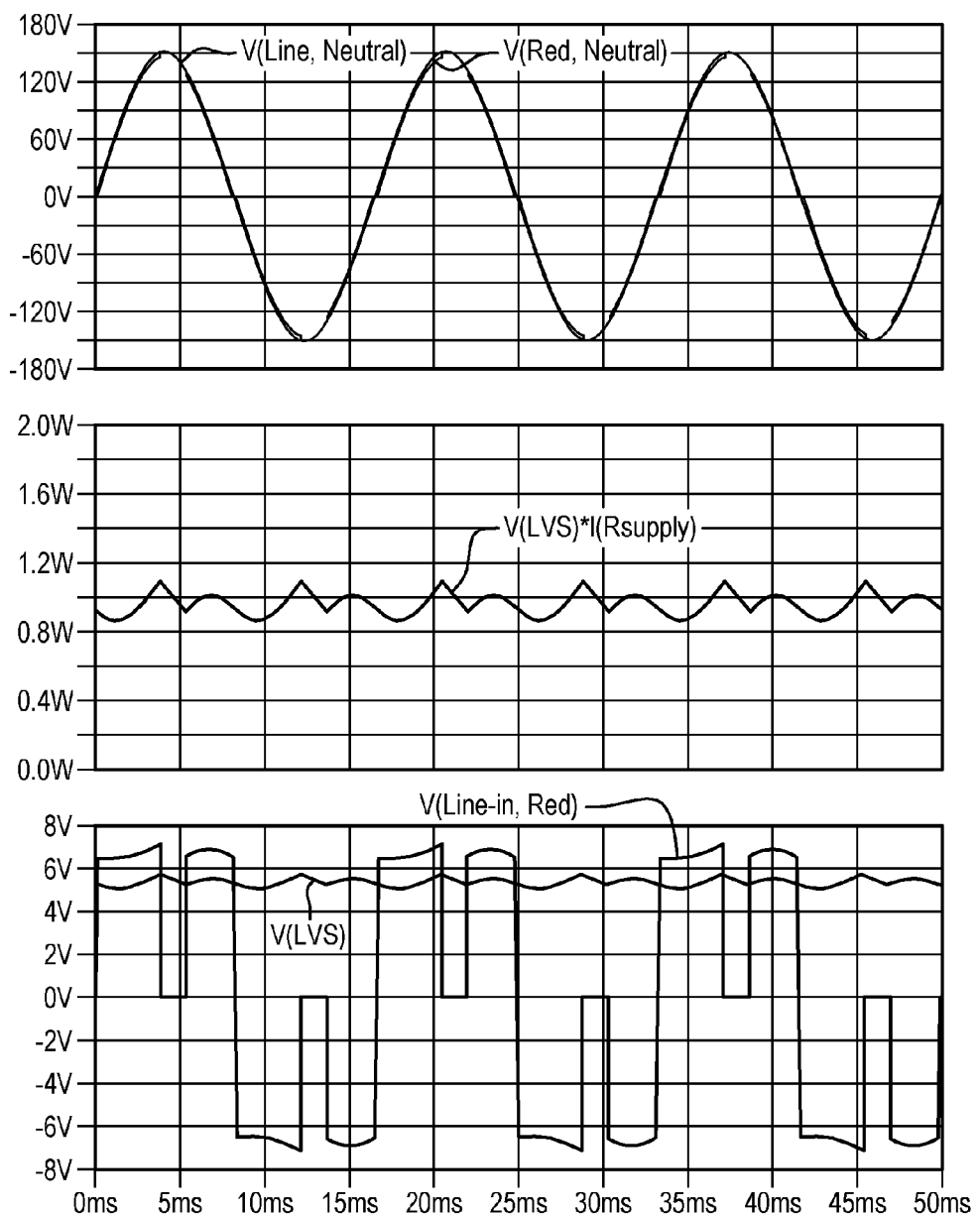
Figure 10B:
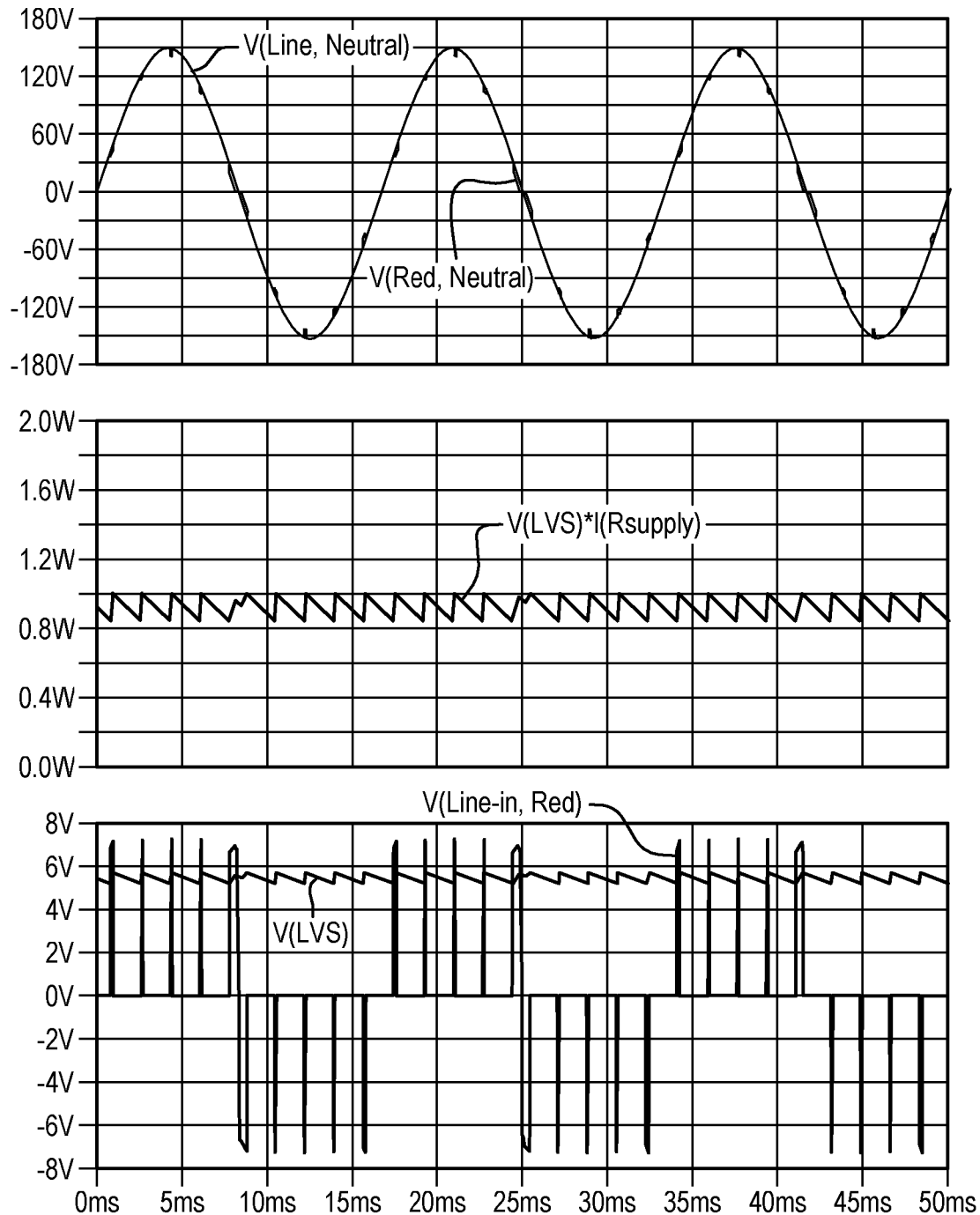
Figure 10C:
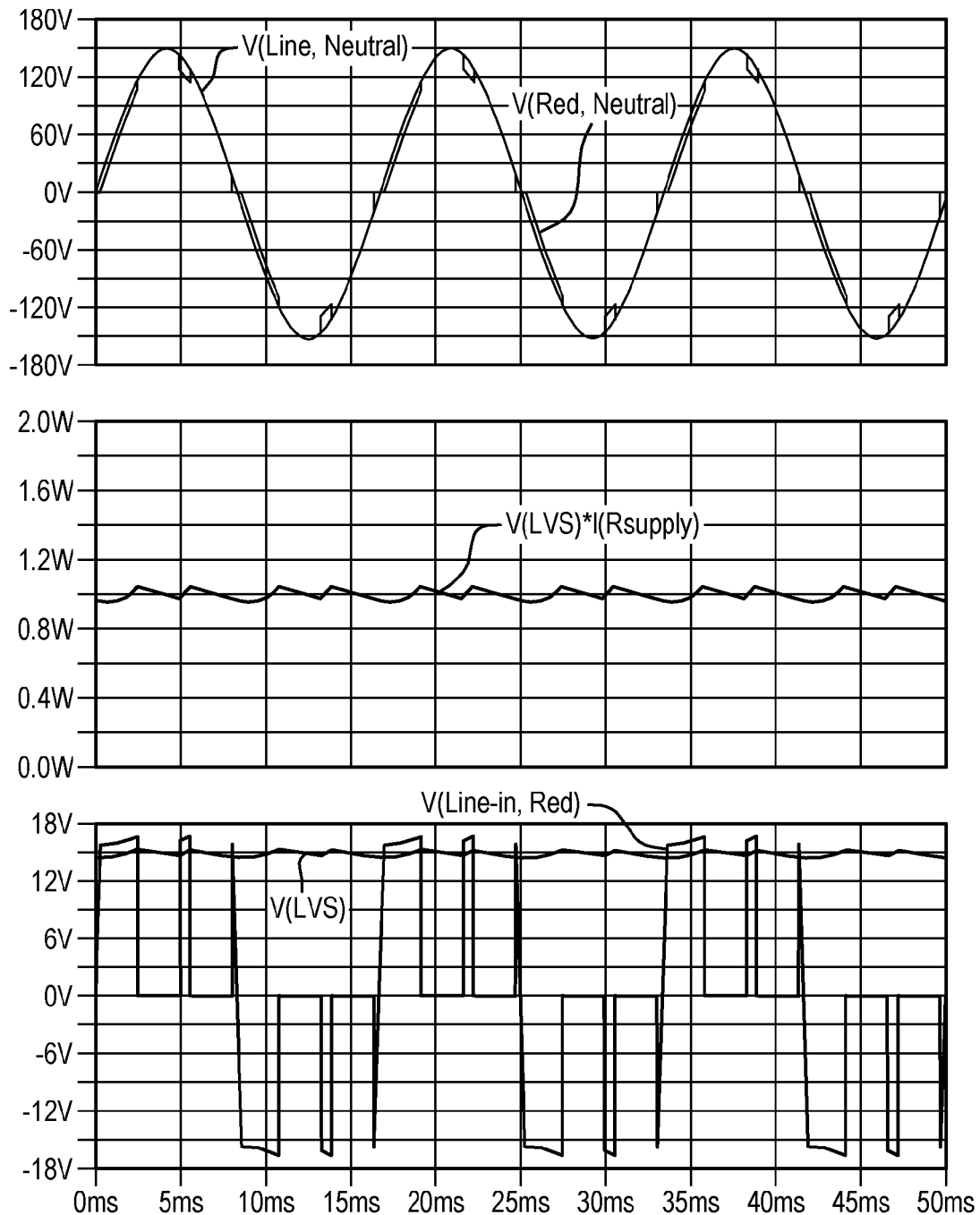
Figure 10D:
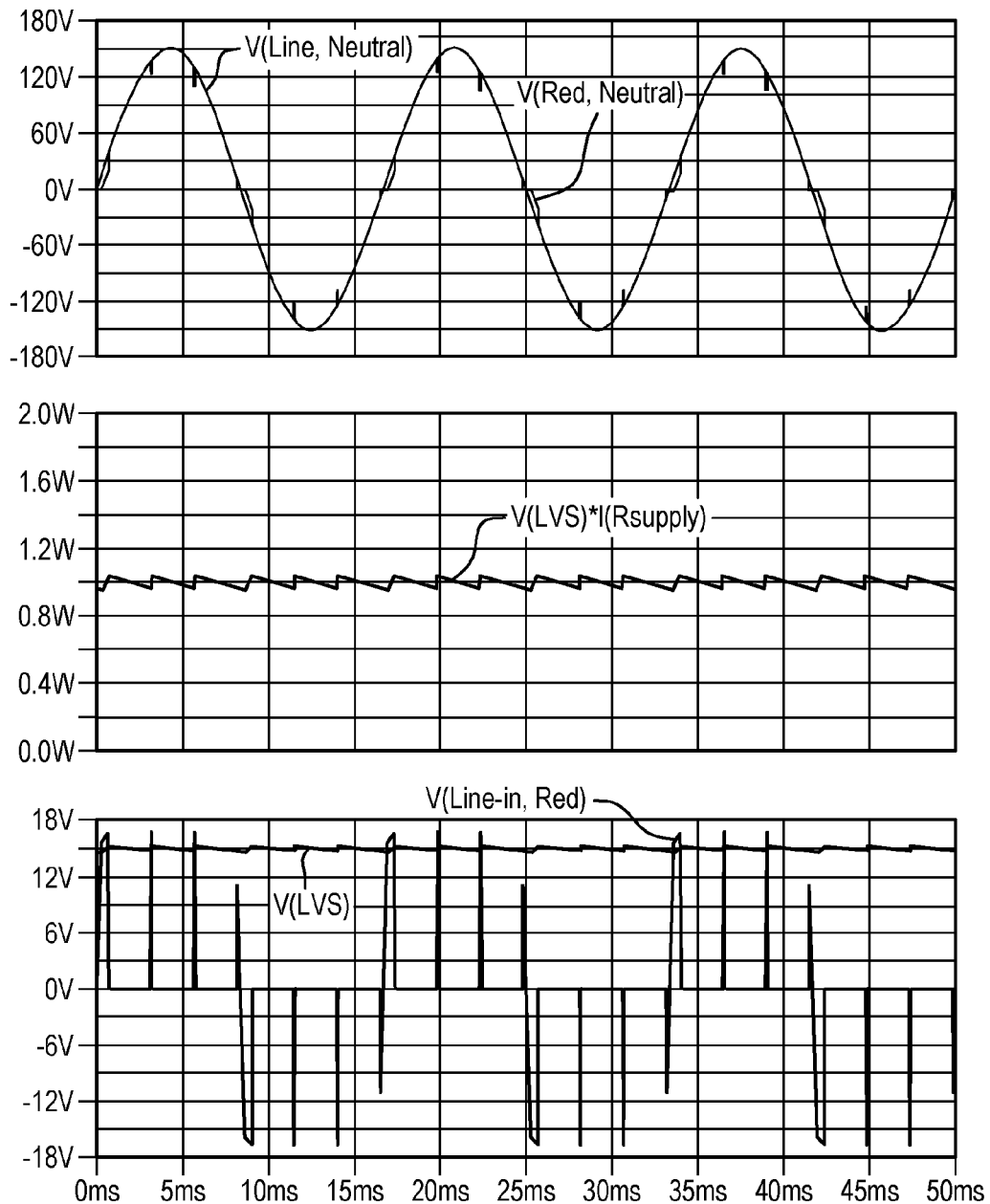
Figure 10E:
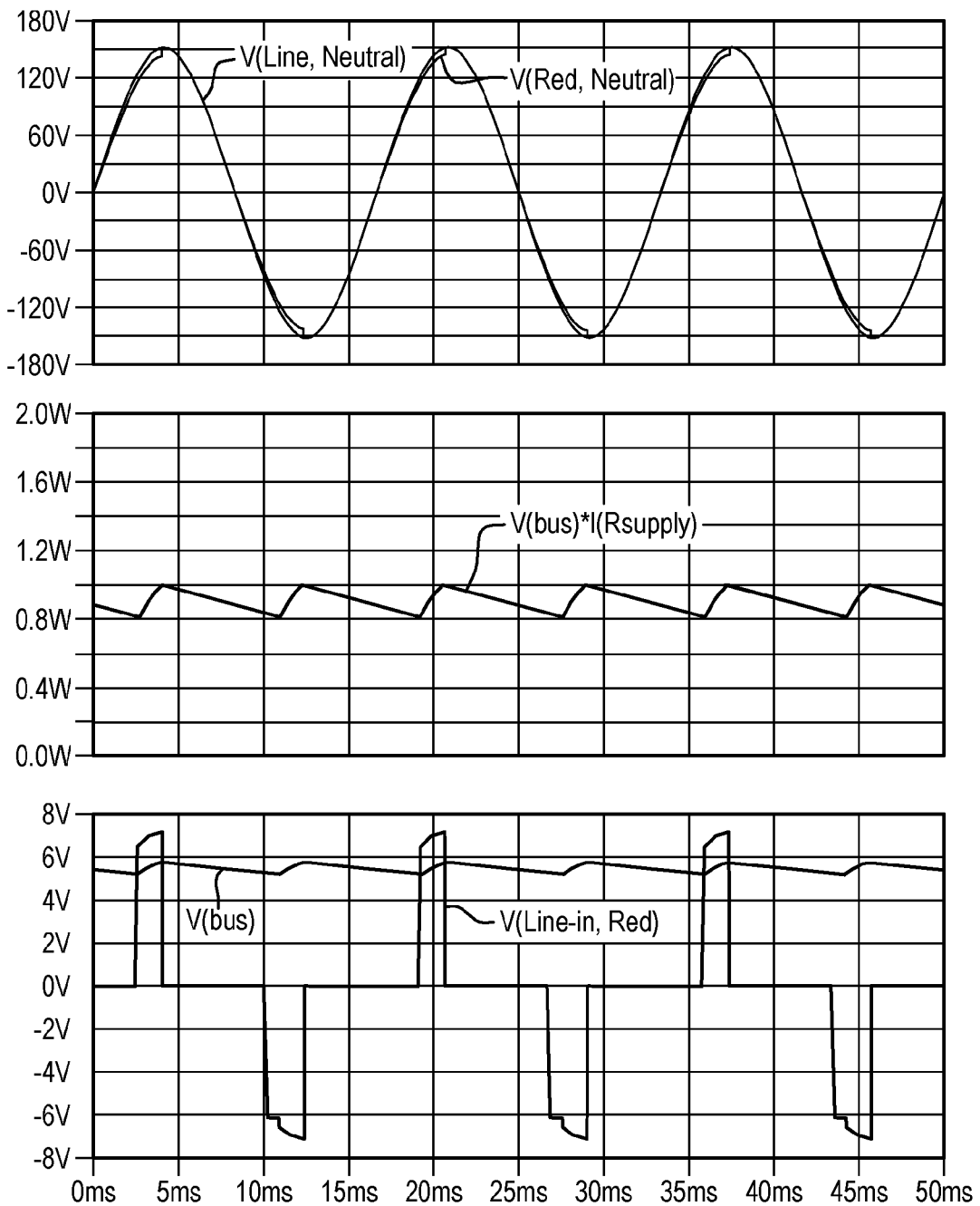
Figure 10F:
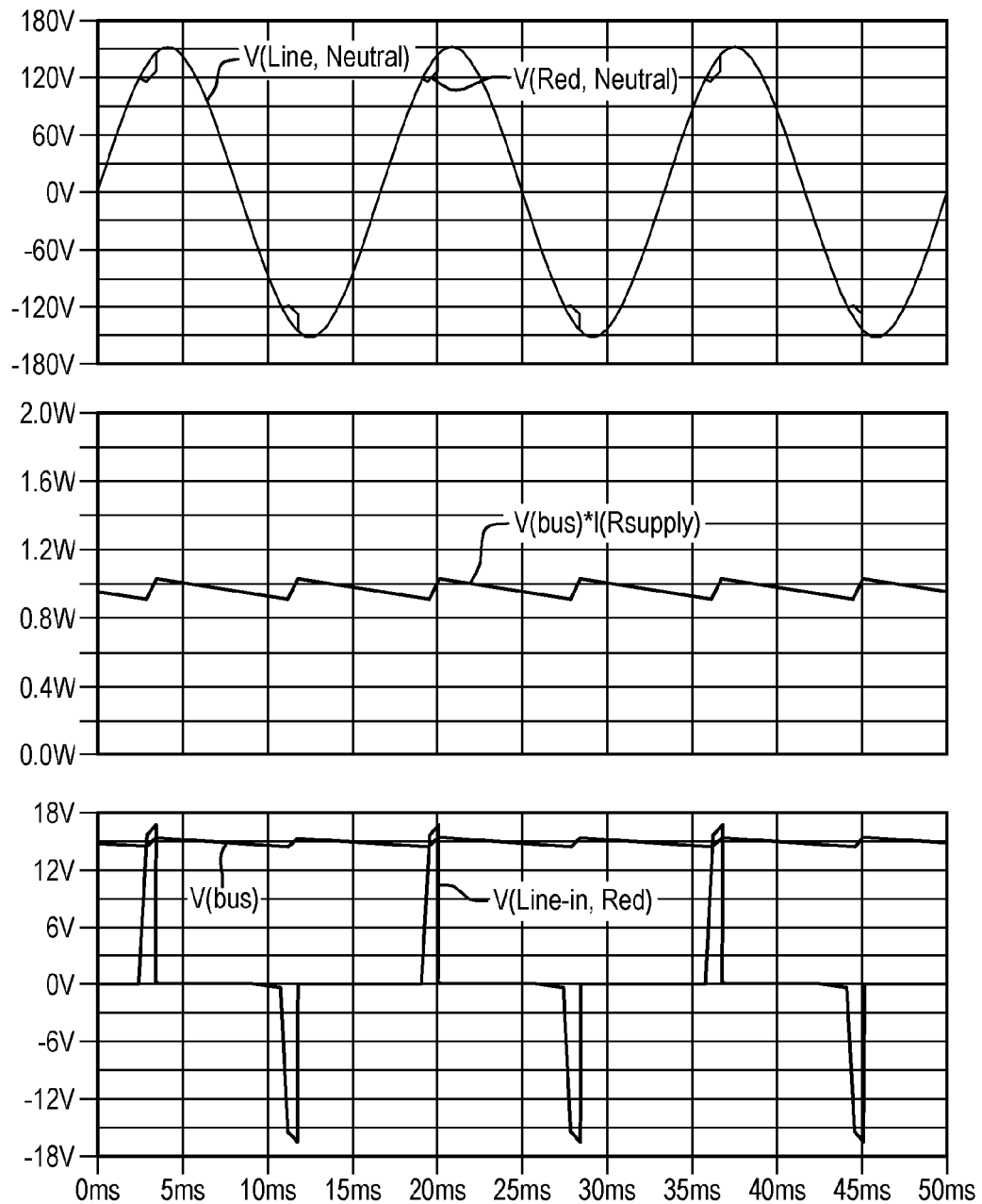
Figure 11:
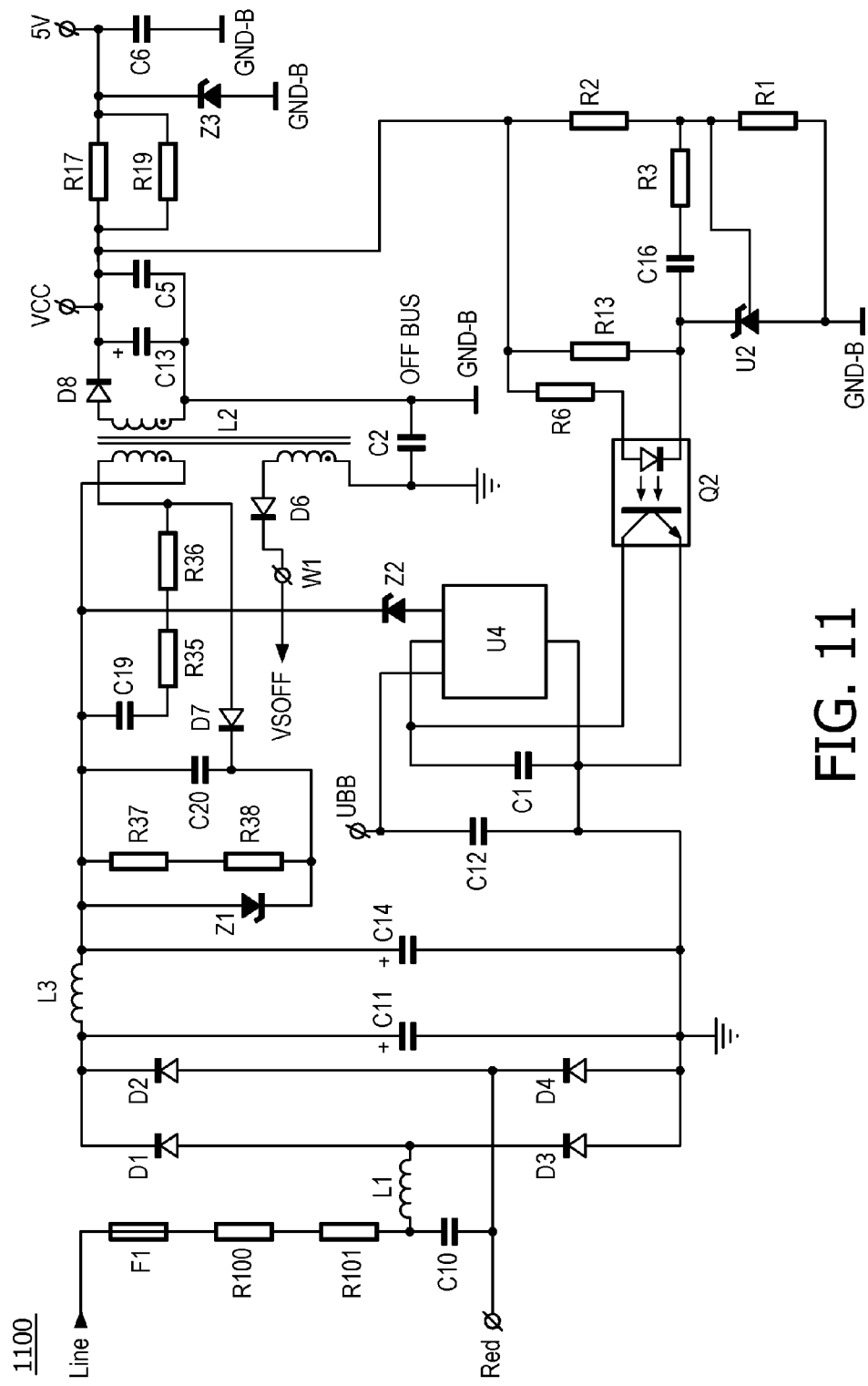
Figure 16:
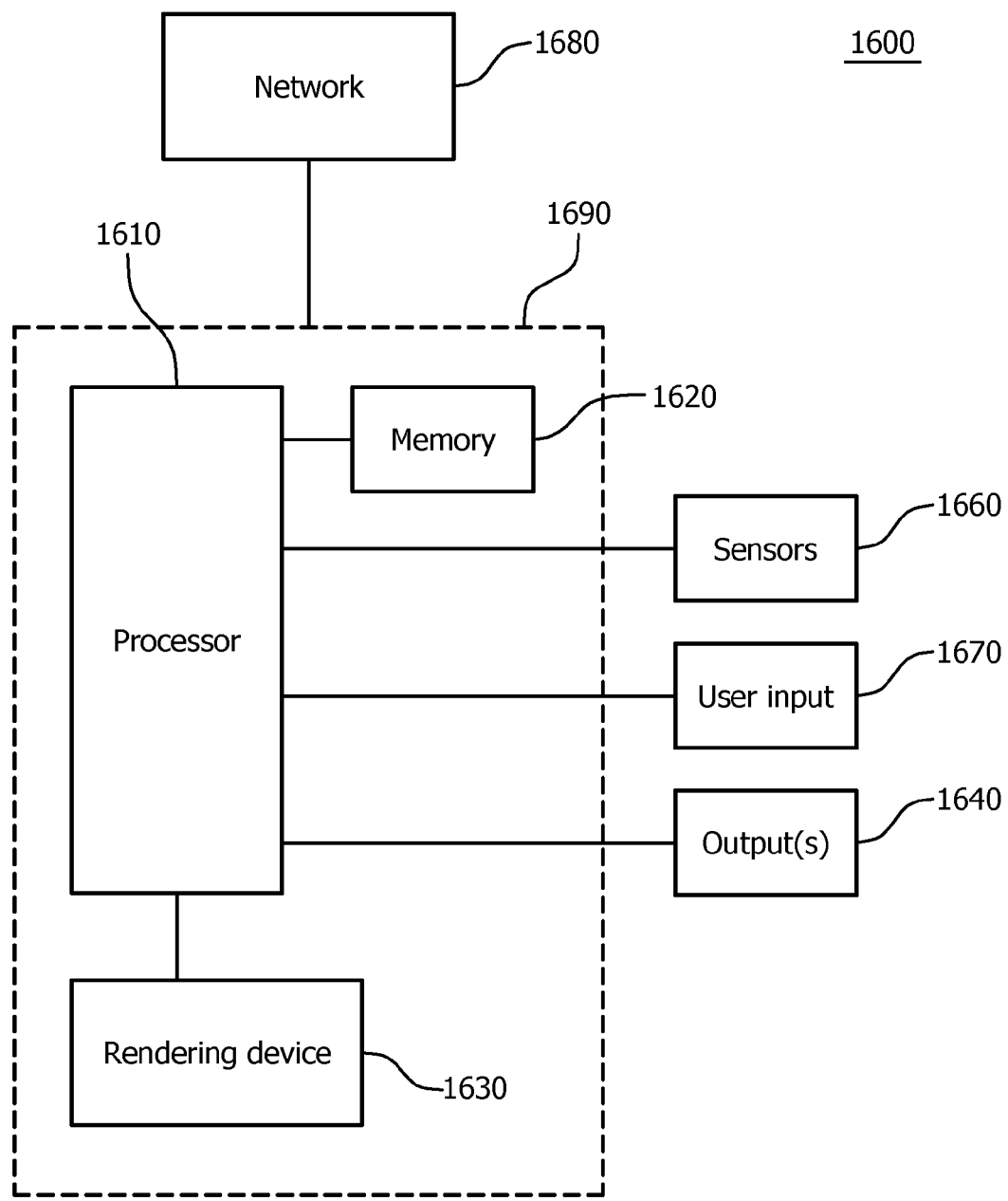

FIG. 8A, which shows graphs of voltage and current waveforms for the ECS in accordance with embodiments of the present system;

FIG. 8B shows graphs of voltage and current waveforms for embodiments the ECS driving an 800 W load with and without boost in accordance with embodiments of the present system;

FIG. 9A is a schematic of portions of an isolated ECS in accordance with embodiments of the present system;

FIG. 9B is a schematic of portions of a non-isolated ECS in accordance with embodiments of the present system;

FIG. 10A shows a graph illustrative of voltage and current waveforms for a non-isolated flyback converter in accordance with embodiments of the present system;

FIG. 10B shows a graph illustrative of voltage and current waveforms for a non-isolated flyback converter in accordance with embodiments of the present system;

FIG. 10C shows a graph illustrative of voltage and current waveforms for the isolated flyback converter of FIG. 9A in accordance with embodiments of the present system;

FIG. 10D shows a graph illustrative of voltage and current waveforms for the isolated flyback converter of FIG. 9A in accordance with embodiments of the present system;

FIG. 10E shows a graph illustrative of voltage and current waveforms for a non-isolated flyback converter in accordance with embodiments of the present system;

FIG. 10F shows a graph illustrative of voltage and current waveforms for the isolated flyback converter of FIG. 9A in accordance with embodiments of the present system;

FIG. 11 shows a portion of an OFF converter corresponding to the OFF converter of FIG. 9A in accordance with embodiments of the present system;

FIG. 12A shows graphs of startup waveforms corresponding to ECS driving the switch loads shown in Table 8 in accordance with embodiments of the present system;

FIG. 12B shows graphs corresponding to ECSs driving the switch loads shown in Table 8 in accordance with embodiments of the present system;

FIG. 13 a portion of an ON converter corresponding to the isolated supply 900A of FIG. 9A in accordance with embodiments of the present system;

FIG. 14A shows graphs and of startup waveforms for the ECSs described in Table 9 in accordance with embodiments of the present system;

FIG. 14B shows graphs and of startup waveforms for the ECSs described in Table 9 in accordance with embodiments of the present system;

FIG. 15 shows graphs of transitions from the OFF converter to the ON converter and back for the ECS load combinations described in Table 9 in accordance with embodiments of the present system; and FIG. 16 shows a portion of a system (e.g., peer, server, etc.) in accordance with embodiments of the present system.

The following are descriptions of illustrative embodiments that when taken in conjunction with the following drawings will demonstrate the above noted features and advantages, as well as further ones. In the following description, for purposes of explanation rather than limitation, illustrative details are set forth such as architecture, interfaces, techniques, element attributes, etc. However, it will be apparent to those of ordinary skill in the art that other embodiments that depart from these details would still be understood to be within the scope of the appended claims. Moreover, for the purpose of clarity, detailed descriptions of well-known devices, circuits, tools, techniques and methods are omitted so as not to obscure the description of the present system. It should be expressly understood that the drawings are included for illustrative purposes and do not represent the scope of the present system. In the accompanying drawings, like reference numbers in different drawings may designate similar elements.

For purposes of simplifying a description of the present system, the terms "operatively coupled", "coupled" and formatives thereof as utilized herein refer to a connection such as an electrical connection and/or a mechanical connection between devices and/or portions thereof that enables operation in accordance with the present system.

In accordance with embodiments of the present system, an electronic control switch (ECS) can function as a switch (e.g., two-pole switch), dimmer switch and/or a load control device to supply power to a load such as an incandescent (resistive) lamp, a ballast (e.g., power-factor (PF) corrected or non-PF corrected ballasts such as fluorescent ballasts), a motor (e.g., a fan or other inductive load), etc., using a two-wire "neutral-less" configuration. Further, an ECS of the present system may include a low-voltage (LV) power supply which may generate LV power for internal LV circuits such as control circuits of the ECS. Further, it is envisioned that embodiments of the present system may include a stand-alone circuit which may be incorporated with a two-wire neutral-less flyback converter to generate LV power (isolated or non-isolated) when the ECS is in an OFF state of operation (such as when the lights are turned off). Further, it is envisioned that with embodiments of the present system the LV power may be generated as isolated direct current (e.g., 3.3 or 5 volts DC although other values and/or ranges are also envisioned) and may be provided to circuits of the ECS which may require LV DC power for operation.

Figure 1:
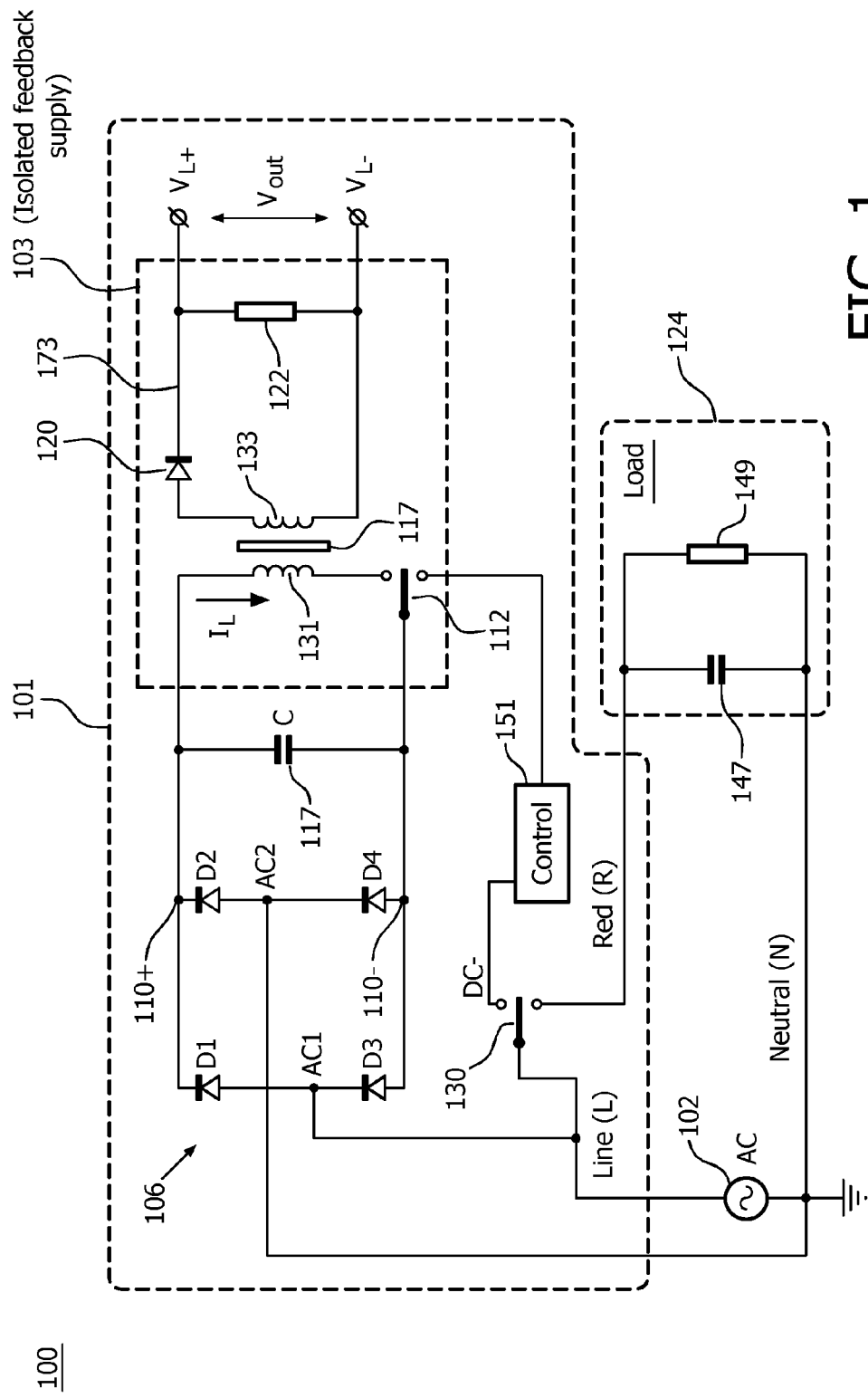
FIG. 1 shows a portion of a circuit of an electronic control switch (ECS) including an isolated flyback supply in accordance with embodiments of the present system.

FIG. 1 shows a portion of a circuit of an ECS 100 including an isolated flyback supply 103 in accordance with embodiments of the present system. An alternating current (AC) source 102 may provide AC voltage to input terminals AC1 and AC2 of a rectifier bridge 106 which may include diodes D1 through D4. The rectifier bridge 106 may then rectify the AC voltage to DC voltage and output this DC voltage (Vdc) across terminals 110+ and 110− and across a bus capacitor 117. More particularly, the flyback supply 103 may include a transformer 116, a primary switch 112, and an output loop 173. The primary switch 112 (e.g., a controllable switch such as a metal-oxide semiconductor field-effect transistor (MOSFET), etc.) may be coupled in series with a primary winding 131 of the transformer 116 across terminals 110+ and 110− (e.g., a DC bus). The primary switch 112 may be controlled by a controller 151 to enter conductive or (substantially) non-conductive states so that a current $I_f$ flow through the primary winding 131 of the transformer 116 may be controlled. More particularly, the current $I_f$ may only flow when the primary switch 112 is conducting. The transformer 116 may include a secondary side winding 133 which may be coupled in series with a diode 120 and a resistor 122 in an output loop 173. A low voltage (Vl) may be output across the resistor 122 at terminals Vl+ and Vl−. In accordance with embodiments of the present system, a capacitor may be coupled in parallel with the resistor 122, if desired. The controller 151 may receive sense information indicative of signal characteristics of the flyback supply 103 such as information related to input and/or output power levels (e.g., Vdc and Vl, respectively) and may control the primary switch 112 accordingly, so that Vl may be maintained at a desired level (e.g., 5V in the present example) which may be required by circuits of the ECS 100.

A main switch 130 may be coupled to the line (L) output of the AC source 102 and may controllably provide power to a load 124. The controller 151 may control the main switch 130 to open (e.g., not conduct) or close (e.g., conduct). For example, if the an ECS 100 is operating as a simple two-pole ON/OFF switch having ON and OFF states, when in the ON state, the controller 151 may control the main switch to close and provide power from the line (L) to the load 124 via a switched hot (R) conductor. Conversely, when in an OFF state, the controller 151 may control the switch 130 to open and therefore prevent the flow of power from the line (L) to the load 124. Accordingly, in these embodiments, the main switch 130 may include a simple relay. However, if the ECS 100 is operating as an electronic dimmer, the main switch 130 may include a TRIAC which may be controlled by the controller 151 to substantially conduct or substantially not conduct so as to pass a desired amount of power to the load 124 depending upon a desired operating state (e.g., OFF, ON, and dim level) of the ECS 100.

The controller 151 may include an isolating opto-coupler which may provide feedback signals from an output of the flyback supply 103 such as voltage and/or current characteristics of a current in the output loop 173.

The load 124 may include a ballast such as may be provided by one or more of a resistor 149 and a capacitor 147 coupled in parallel (e.g., to form an RC circuit) and may be coupled across the switched hot (R) and neutral conductors (N) and/or an actual load (e.g., an incandescent lamp, a fluorescent ballast, etc.) for controlling a suitable lamp.

In the shown embodiment, the rectifier bridge 106 is coupled to both the line (L) and neutral (N) terminals of the source 102 and is considered a three-wire configuration. A two-wire configuration will now be shown with reference to FIG. 2A.

Figure 2A:
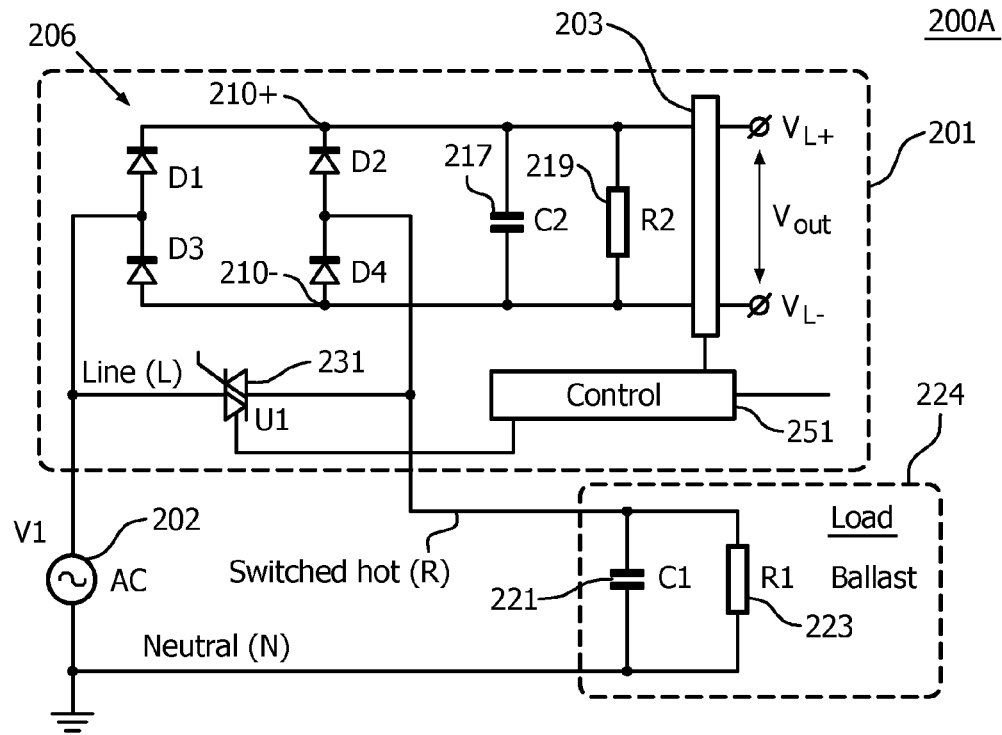
FIG. 2A shows a portion of a circuit of an ECS in accordance with embodiments of the present system.

FIG. 2A shows a portion of a circuit of an ECS 200A in accordance with embodiments of the present system. The ECS 200A may be similar to the ECS 100, and includes a rectifier bridge 206 having diodes D1 through D4 and may receive AC voltage at terminals AC1 and AC2 from an AC source 202. Thereafter, the rectifier bridge 206 may rectify the AC voltage input thereto into a DC voltage (Vdc) and output the DC voltage (Vdc) at terminals 210+ and 210−. However, unlike the ECS 100, a main switch 231 (e.g., a TRIAC) is coupled across the terminals AC1 and AC2 of the rectifier bridge 206.

An isolated flyback supply 203 may be similar to the isolated flyback supply 103 and receives the DC voltage input across terminals 210+ and 210− and outputs an isolated output voltage Vout (e.g., a low-voltage such as 5 volts, etc.) across terminals Vout1 and Vout2 to be used by internal circuitry of the ECS 200A. A controller may control the overall operation of the flyback supply 203 and may receive feedback (FDBK) information related to signal characteristics of output voltage (e.g., Vout) and/or current and switch a primary switch of the flyback supply 203 accordingly so as to control Vout. Further, when the ECS 200A is determined to be in an ON state, the controller 251 may control the main switch 231 to conduct power from the line (L) to a load 224. Conversely, when the ECS is determined to in an OFF state, the controller 251 may control the main switch 231 to substantially not conduct.

The load 224 may be coupled between the switched hot (R) and neutral conductors and in series with the main switch 231. The load 224 may be similar to the load 123 and may include one or more of a capacitor 221 and a resistor 223 which may be selected in accordance with desired voltage and/or current values and/or ranges so as to output a voltage Vout across the resistor 223.

The switch 231 may include a TRIAC with a control line (G) which, when triggered (e.g., by the controller 251), configures the CBSS to conduct so as to deliver a controlled amount of power from the AC source 202 to the load 224 so that a desired output voltage Vout waveform may be obtained at the load 224. In operation, once triggered, the TRIAC will conduct until a current flowing within the TRIAC falls below a minimum holding current at which time the TRIAC will open (and substantially not conduct) until retriggered.

Figure 2B:
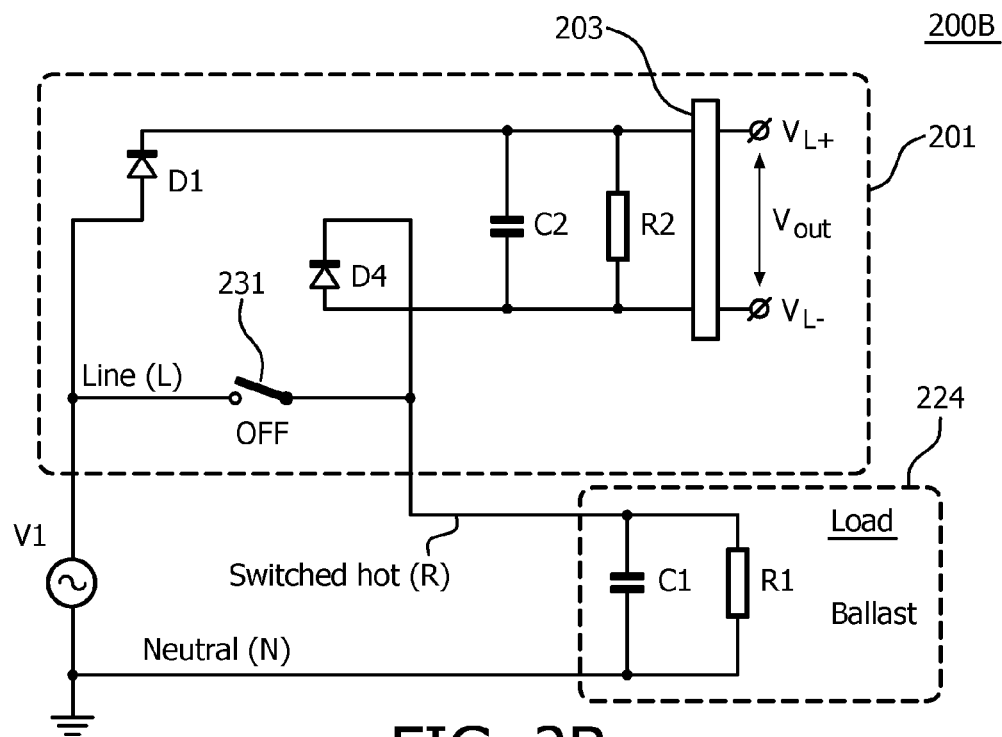
FIG. 2B shows an equivalent circuit diagram for the ECS of FIG. 2A in an OFF state in accordance with embodiments of the present system.

The ECS 200A may have two or more operative states e.g., ON and OFF states. An equivalent circuit 200B diagram for ECS 200A in the OFF state is shown in FIG. 2B. Similarly, an equivalent circuit 200C diagram for the ECS 200A in the ON state is shown in FIG. 2C.

Referring to FIG. 2B in the OFF state, the main switch 231 is open and therefore substantially not conducting. Substantially all the AC voltage of the AC source is provided to the rectifier bridge 206. Accordingly, the flyback supply 203 may be operative to generate low-voltage power Vout which may be available across output terminals VI+ and VI− of the flyback supply 208. Accordingly, isolated low-voltage power necessary for operation of low voltage circuits such as a control circuits, etc. may be provided by the flyback supply 208.

Figure 2C:
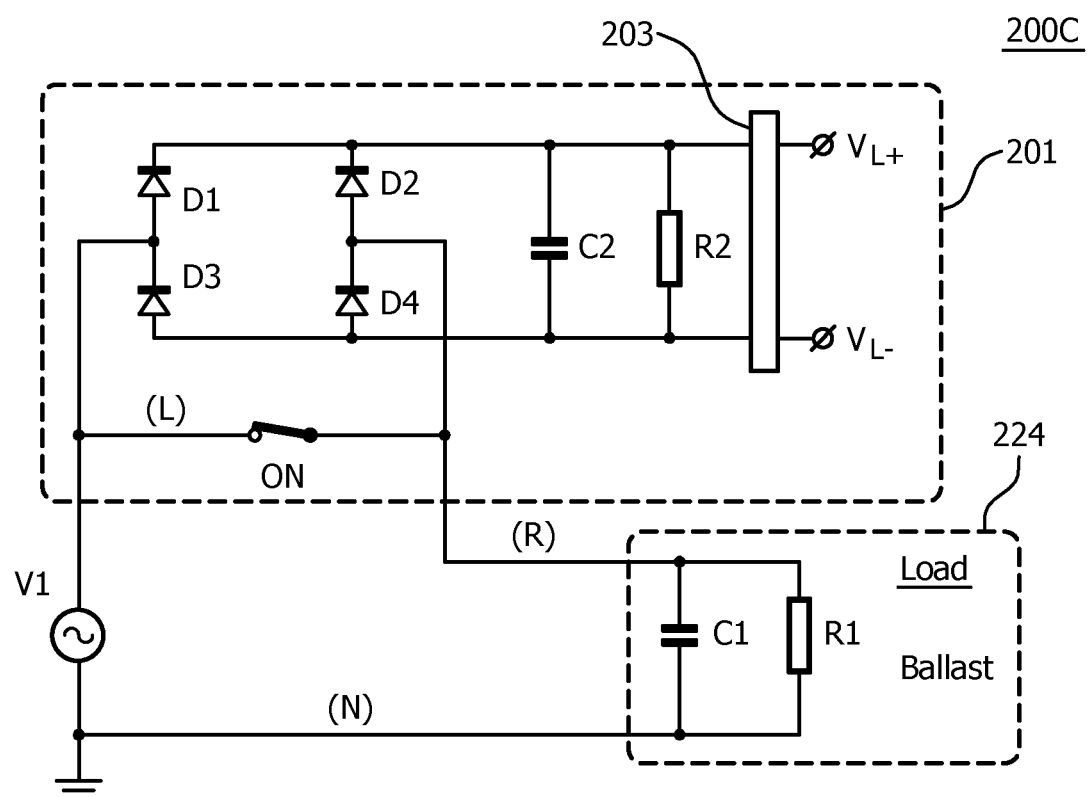
FIG. 2C shows an equivalent circuit diagram for the ECS of FIG. 2A in the ON state in accordance with embodiments of the present system.

FIG. 2C which shows a portion of the flyback switch 200A of FIG. 2A with the TRIAC 230 in a closed position (e.g., conducting). Accordingly, assuming that the main switch 231 has little or no resistance, when the TRIAC 230 is closed (e.g., on or conducting) it can be assumed that substantially no AC voltage falls across the rectification bridge 206 as terminals DC1 and DC2 are at substantially the same potential. However, if the main switch (e.g., the TRIAC) has a threshold internal resistance (e.g., when in a conductive state), this threshold internal resistance may be used to block a small portion of the AC source voltage (e.g., across the main switch 230) and generate enough power for operation of the flyback supply 203. This threshold internal resistance may be greater than, for example, 1000 kiloohms. However, it is envisioned that the threshold resistance may have other values in this and/or other embodiments.

Further, the ECS 200A may include a blocking circuit to restrict power transfer from the source 202 to the load 224, if necessary. Moreover, the controller may control the TRIAC to obtain a desired dimming level at the load 224, if desired.

Figure 3:
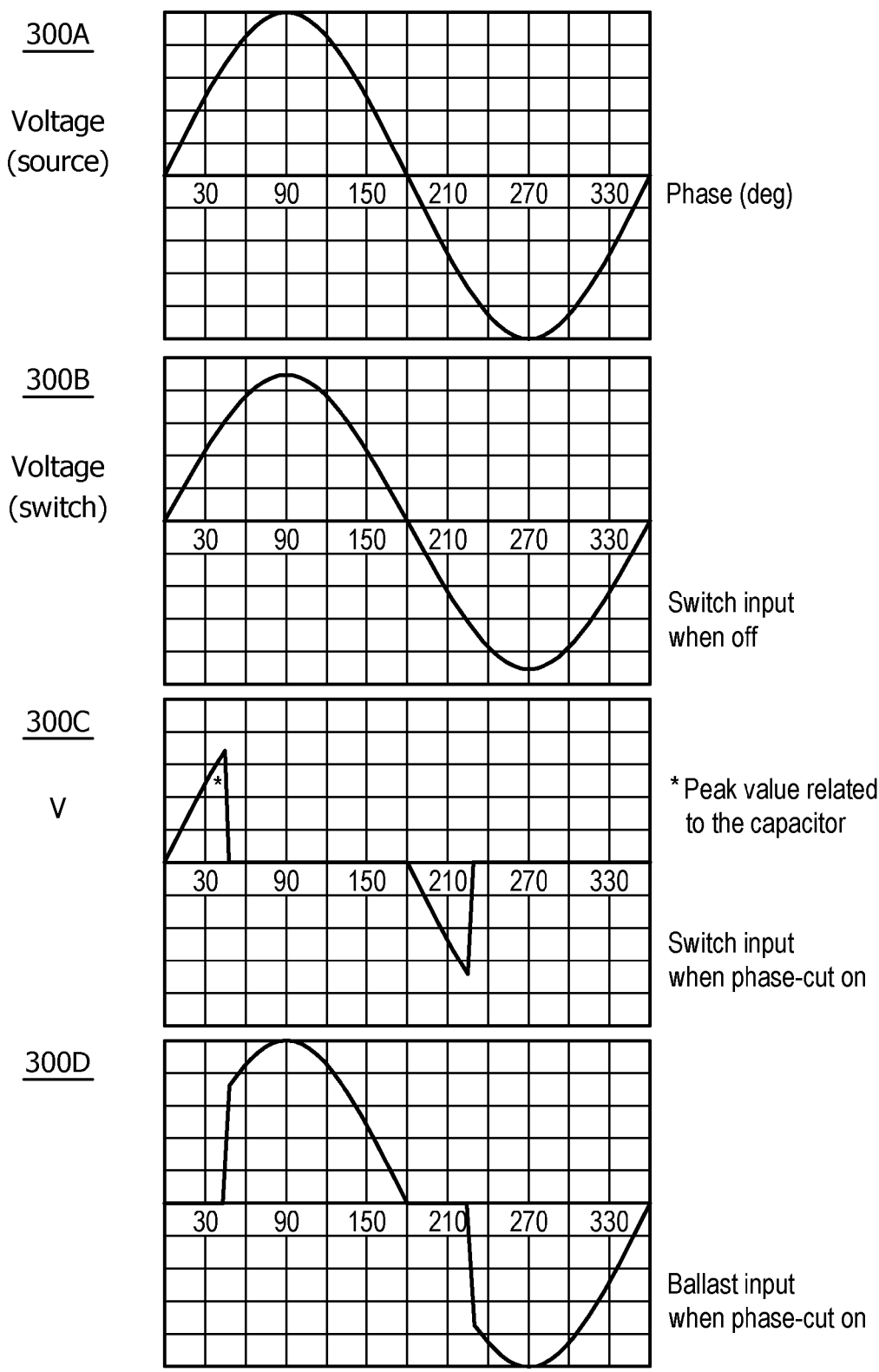
FIG. 3 shows voltage characteristics of the flyback switch in accordance with embodiments of the present system.

FIG. 3 shows voltage characteristics of the flyback switch 200A in accordance with embodiments of the present system. More particularly, graph 300A illustrates an AC output voltage of the AC source 202 as a function of phase (deg.). Graph 300B illustrates an input voltage of the TRIAC of the main switch 231 (e.g., switch input) when the TRIAC is in an off state (e.g. is substantially not conductive). Graph 300C illustrates the input voltage of TRIAC of the main switch 231 with phase-cut on. Graph 300D illustrates an input voltage of the load 224 when phase-cut is on. The phase cut may for example be controlled by the controller 251 controlling on/off states of the main switch 231.

Figure 4:
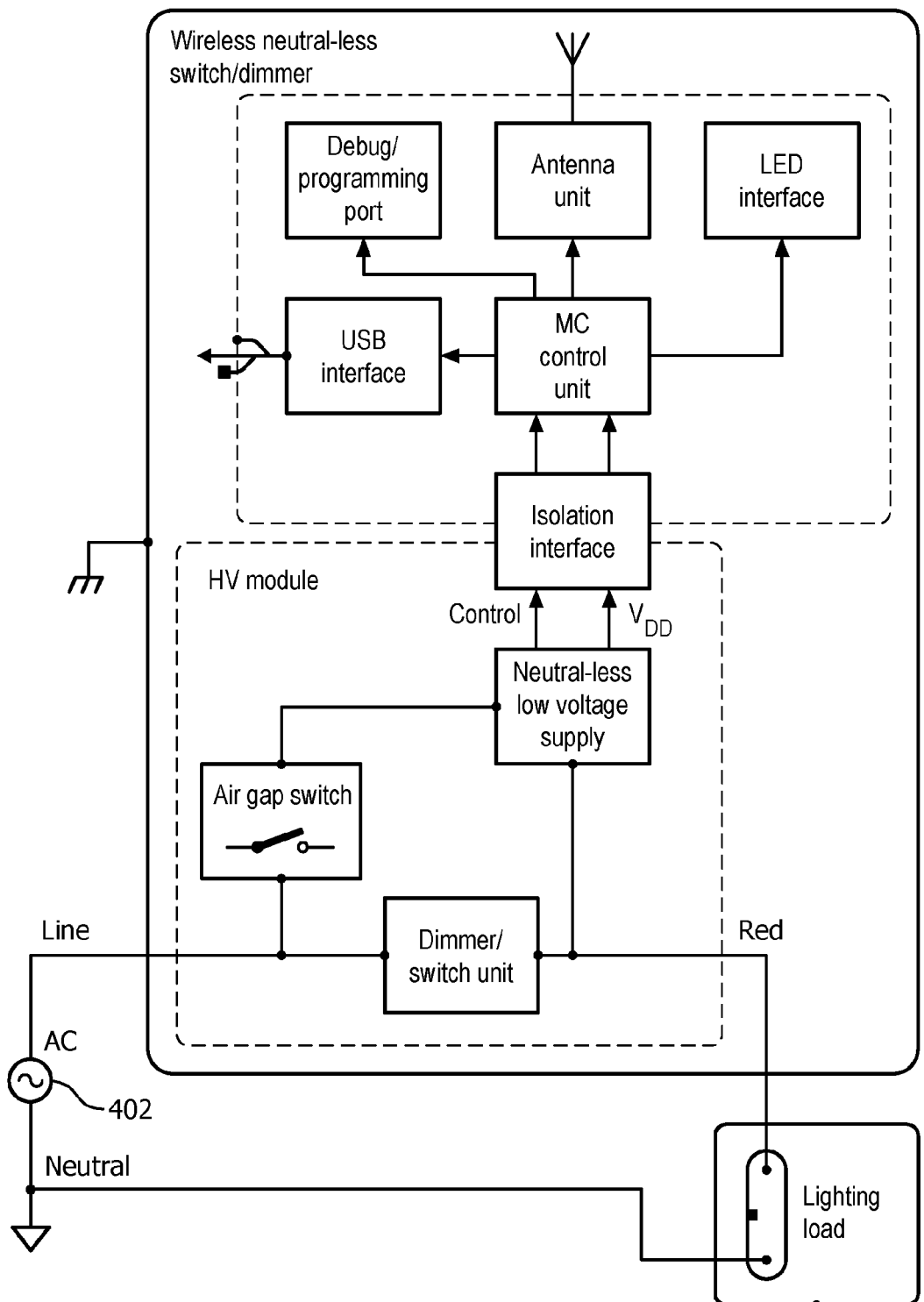
FIG. 4 is a schematic diagram of an ECS in accordance with embodiments of the present system.

FIG. 4 is a schematic diagram of an ECS 400 in accordance with embodiments of the present system. The ECS 400 may be similar to the ECS 200C of FIG. 2C and is connected to only two main conductors: line and switched line. The ECS 400 may receive AC voltage from an AC source 402 which may include line and neutral conductors.

Figure 5C:
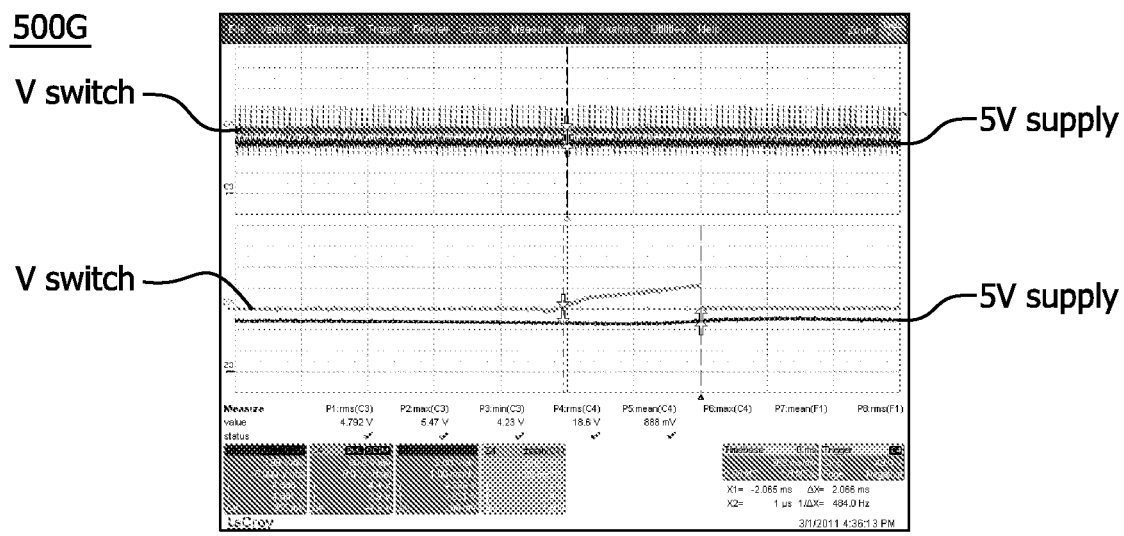
FIG. 5C shows test results of the ECS of FIG. 2A in accordance with embodiments of the present system.

Test results of the ECS 200A of FIG. 2A in accordance with embodiments of the present system are shown in FIGS. 5A, 5B, and 5C. During the test, ECSs such as ECS 200A in accordance with embodiments of the present system were operated in a neutral-less two-wire configuration. Accordingly, the ECS 200 was only connected using a two-wire configuration with line (L) and switched hot conductors (R) as AC input and AC output, respectively. The ECS was then used to drive various loads (e.g., 224) as will be described below. These loads were set to give 0.6 W of resistance during standby (e.g., OFF) operation.

With reference to graph 500A measurements for this graph were obtained with the main switch (231) off and at 108V, with 40 W incandescent load. It is seen that a low-voltage (LV) supply (e.g., Vout of about 5 volts at terminals VI+ and VI− of the flyback supply) is stable. Voltage across the main switch is shown as V-switch.

With reference to graph 500B, with a single 32 W fluorescent lamp ballast (e.g., at 108 V) as a load, the LV supply starts to dip slightly. Accordingly, ballast capacitance (e.g., in the load 224) may be increased to control the LV dip.

With reference to graph 500C, this is the same circuit as described above with reference to graph 500B except a capacitance has been added across the ballast and the LV supply is now seen to be stable. In the present example, a 470 nF capacitor is coupled in parallel with a capacitor of the load (e.g., 224, which has a 200 nF internal capacitance). Accordingly, it is seen that the load 224 may need a minimum capacitance.

With reference to graph 500D, this is the same circuit as described above with reference to graph 500C with a single 32 W fluorescent lamp as a load as described above with a 277V (AC) switch voltage (V switch) with the main switch (231) OFF. As can be seen from the graph, the LV supply is stable.

Graphs 500E through 500G illustrate examples with the main switch (231) in an ON state (e.g., the TRIAC is in a conductive state).

With reference to graph 500E, with a 40 W incandescent load, the LV supply starts to dip down when the main switch is ON and operating with a min phase angle, accordingly, the phase angle may be increased to reduce or prevent the dip in the LV supply.

With reference to graph 500F, with a 40 W incandescent load, the LV supply is stable at a min phase angle of 47.5°.

With reference to graph 500G, with a 10 uF capacitor added to an input of the flyback supply 203 (e.g. across capacitor C2 of FIG. 2A) and in parallel with the capacitor 117, the minimum phase angle is reduced to 45° when the main switch (231) is ON for a stable LV waveform of 5V.

Figure 7A:
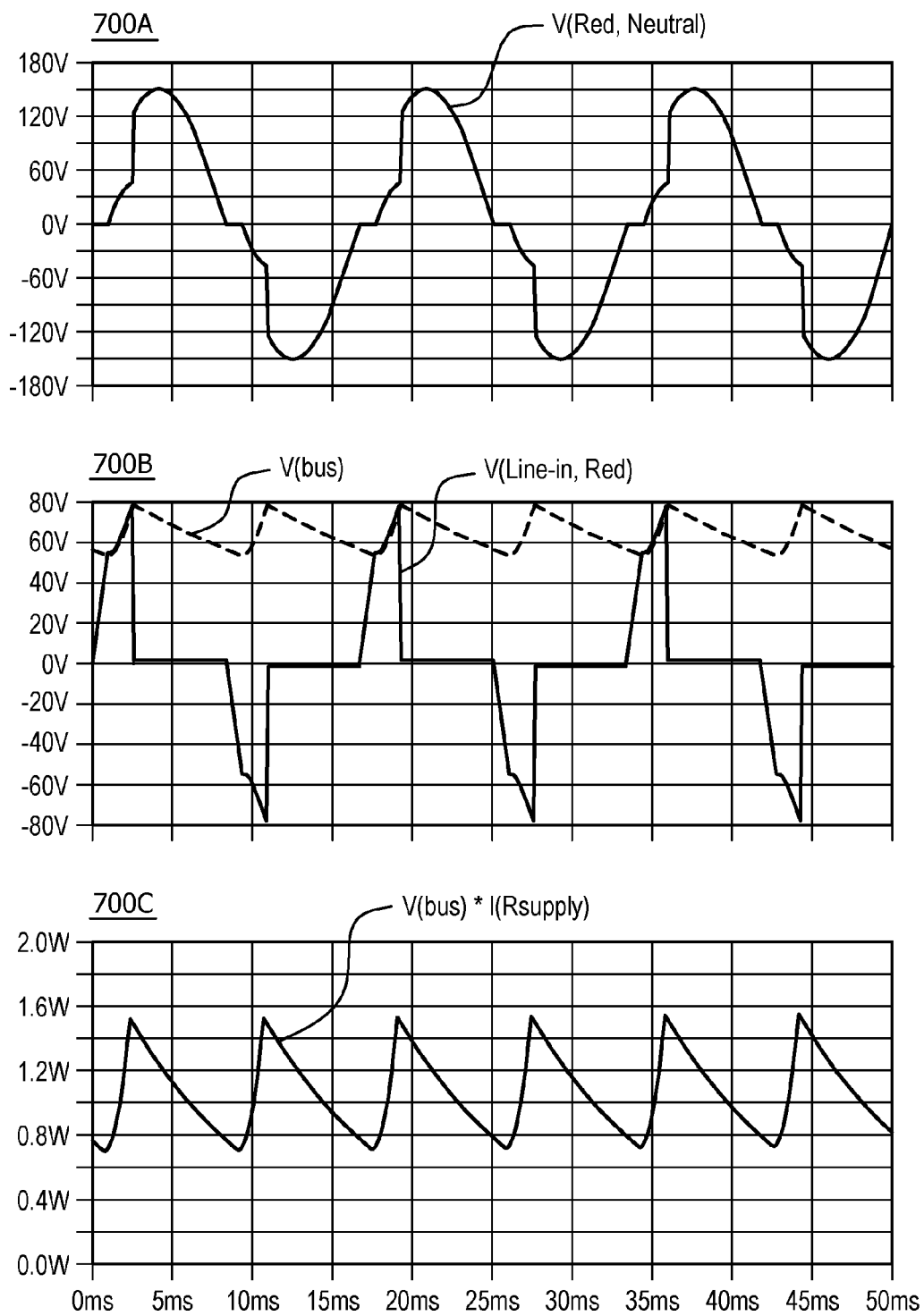
FIG. 7A shows graphs of simulation results for phase-cut simulations for an ECS in accordance with embodiments of the present system.
Figure 7B:
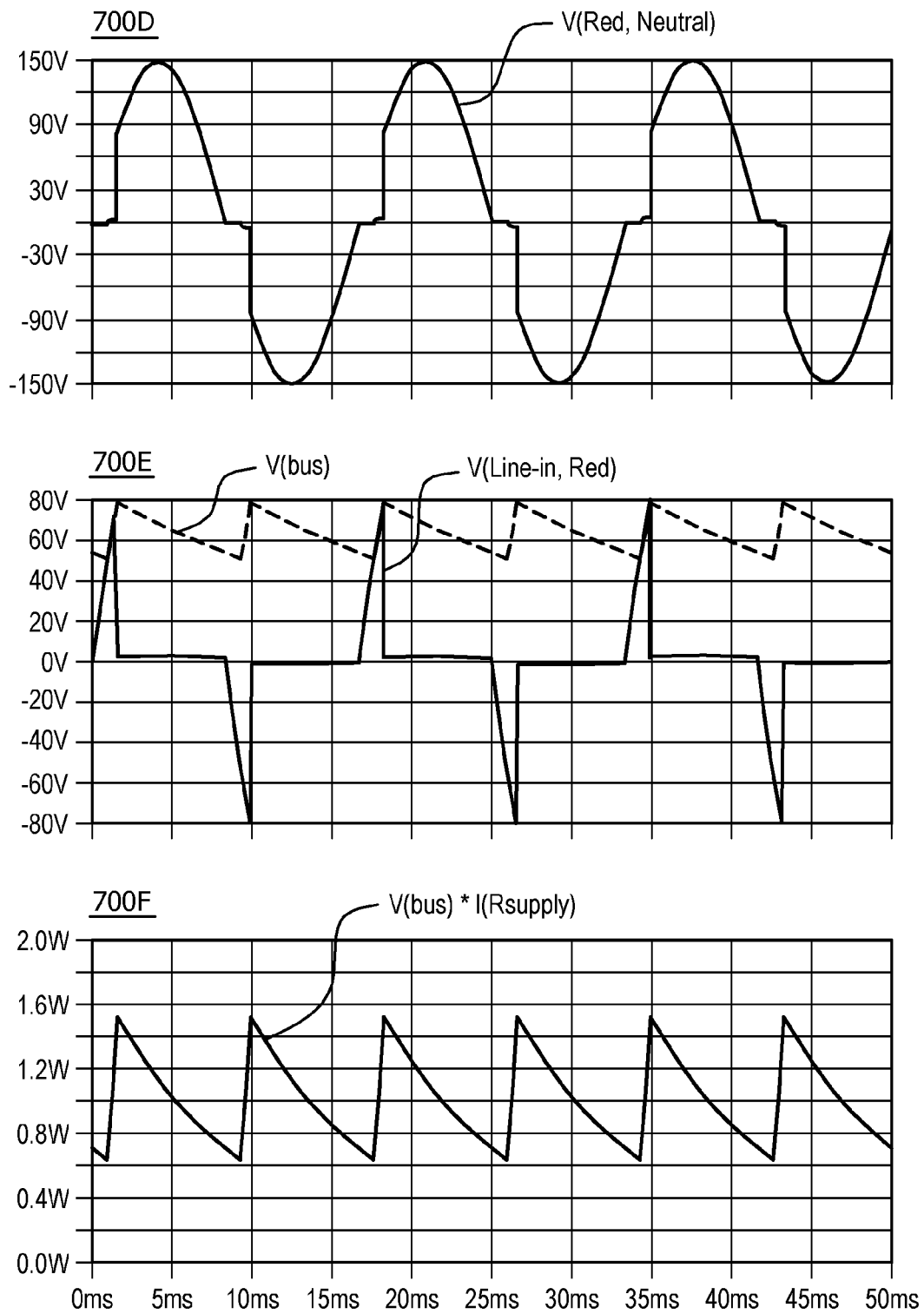
FIG. 7B shows graphs of simulation results for phase-cut simulations for an ECS in accordance with embodiments of the present system.

The operation of an ECS including a flyback supply in accordance with embodiments of the present system was tested with respect to the phase cut voltage. Accordingly, simulations were conducted to determine the phase cut required to deliver 250, 500, and 1000 mW of LV power by a flyback supply of a corresponding ECS. FIG. 7A shows graphs 700A through 700C of simulation results for phase cut simulations for an ECS in accordance with embodiments of the present system. Similarly, FIG. 7B shows graphs 700D through 700F of simulation results for phase cut simulations for an ECS in accordance with embodiments of the present system. A worst case is seen to occur at a low line (L) voltage of 108V (e.g., provided by an AC source) which is input into the flyback converter. Test results for an incandescent load are illustrated below in Table 1 for a low voltage (LV) load of 1.0 W. The LV load is load supplied by an output of the flyback supply. More particularly, referring to graphs 700A through 700F. Graph 700A: is a plot of load voltage across the 40 W lighting load (e.g., measured at red (R) and neutral lines (N). Graph 700B is a plot of voltage (Vbus) across the bus capacitor (e.g. see, 117 of FIG. 1) and a plot of voltage across an input of flyback converter (e.g., V (line-in Red). Graph 700C is a plot of instantaneous power (e.g., V (bus)*I(Rsupply)) in a low voltage (LV) load. Graph 700D is a plot of load voltage (V(red, neutral) across 40 W lighting load. Graph 700E is a plot of voltage across the bus capacitor (V (bus)) and a plot of voltage across an input of the flyback supply (V (line in, Red). Graph 700F is a plot of instantaneous power in a low voltage (LV) load (V (bus)*I (Rsupply))

A minimum input line (L) voltage required for flyback supply operation has not been taken into consideration. However, for minimum line (L) input voltage operation phase-cut may be higher.)

TABLE 1

| Load power, W | EWS power, mW | Phase cut angle, deg | DC bus voltage, avg | DC bus voltage min |
|---|---|---|---|---|
| 40 | 1000 | 56 | 64 | 53 |
| 40 | 500 | 42 | 45 | 37 |
| 40 | 250 | 32 | 31 | 25 |
| 800 | 1000 | 34 | 63 | 50 |
| 800 | 500 | 24 | 45 | 36 |
| 800 | 250 | 18 | 32 | 26 |

With reference to Table 1, it is seen that as the internal power required for the ECS (internal power) decreases so does the required phase cut angle. The phase cut angle also changes with the main switch's (e.g., 231) load power. Higher loads allow the capacitor 117 to be charged faster reducing the angle.

It is desirable to reduce the phase cut angle to a minimum possible value required to generate a desired 1000 mW of power for the LV output of the flyback supply (e.g., 203). In accordance with embodiments of the present system, a boost converter may be used to increase bus voltage of the DC bus (e.g., 210+ and 210−) at an input of the flyback supply (e.g., 203). This increase in voltage provides for more charge to be stored in the capacitor 217 of the flyback supply 103 which may then be output by the flyback supply 203. This may then reduce the phase cut to a minimum, causing minimum interference to loads receiving power from the flyback supply 203.

Figure 6A:
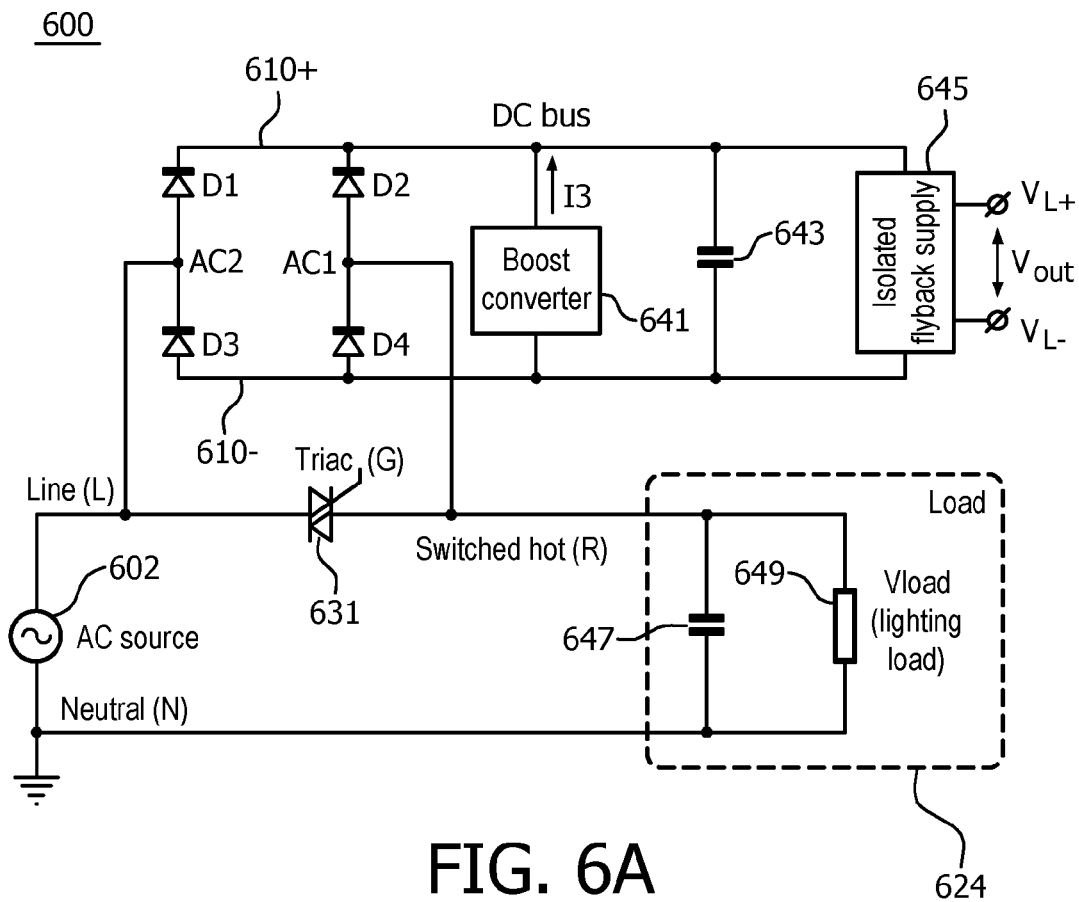
FIG. 6A shows a portion of a circuit of an ECS in accordance with embodiments of the present system.

FIG. 6A shows a portion of a circuit of an ECS 600 in accordance with embodiments of the present system. The ECS 600 may be similar to the ECS 200A, and includes a rectifier bridge 606 having diodes D1 through D4 which may rectify an AC voltage input thereto into a DC voltage output at terminals 610+ and 610− of a DC bus. A boost converter 641 is mounted across terminals 610+ and 610− of the DC bus and controllably drives a current I3 through a capacitor 643 and/or an isolated flyback supply 645 which is similar to the flyback supply (103, 203) Care should to be taken to see that the boost operation is stable. A triac 631 is coupled in series with a load 624 to a voltage source 602 which provides line (L) and neutral (N) inputs. A controller may control the operation of the boost converter 641 so that the boost operation is stable. The flyback supply 645 may output a low-voltage Vout across terminals VI+ and VI−. Vout may then be used to power internal circuitry of the ECS 600. The controller may also control operation of the flyback supply 645 and/or a main switch such as a TRIAC 631. The controller may receive one or more feedback signals which include information related to signal characteristics within the ECS 600 such as one or more of DC bus voltage, current I3, Vout, output current (Iout) at the low-voltage output, AC source voltage, current, and/or phase, as well as Vload, etc. The controller may include one or more logic gates, comparators, application specific integrated circuits (ASICs), microprocessors, etc., which may be integral with each other or distributed throughout the ECS 600.

Figure 6B:
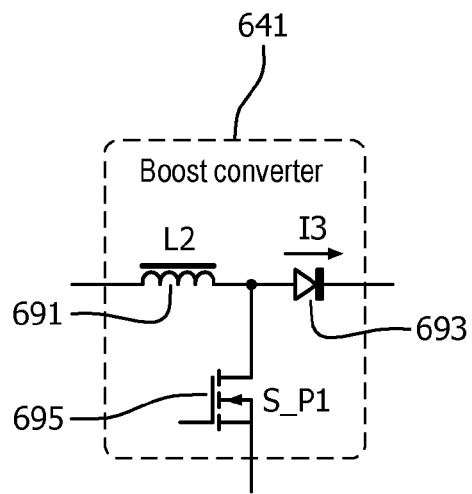
FIG. 6B is a schematic of the boost converter of the circuit shown in FIG. 6A.

FIG. 6B is a schematic of the boost converter 641 of the circuit shown in FIG. 6A. The boost converter 641 may include an input inductor 691 a switch 695, and a diode 693. The switch 695 may include a controllable switch such as a power MOSFET. When the switch 695 turns on (e.g., becomes conductive) current builds up through the inductor 691. When switch 695 turns off, the inductor 695 forces this current through diode 693 into the output capacitor (e.g., see, 643 FIG. 6A) coupled thereto. Since the input voltage of the boost converter 641 adds to the voltage developed across the inductor 691, the output voltage of the boost converter 641 is higher than the input voltage and provide the boost action. Any suitable commercially-available boost control integrated circuit may be used to control, for example, the switch 691 so as to control the output voltage of the boost converter 641.

Test results of simulations of the ECS 600 driving light and heavy loads will be illustrated below with reference to FIG. 8A and FIG. 8B below.

With regard to light loads, experimental results are illustrated with respect to FIG. 8A, which shows graphs 800A through 800D of voltage and current waveforms for embodiments the ECS 600 operating with a phase cut of 41° and having an incandescent load of 40 W. More particularly, graphs 800A and 800B illustrate waveforms obtained without using the boost converter 641 to boost voltage of the DC bus (e.g., see, 610+ and 610−) and graphs 800C and 800D illustrate the same waveforms with voltage boost on the DC bus. In graphs 800A through 800D, the DC bus voltage is shown as V bus. V red, neutral is a voltage across a load capacitor 647 of the load 624, It is seen that no boost operation is obtained. Comparing graphs 800A and 800C it is seen that distortion of the load voltage (V-load) may be reduced for a similar power outputs when the boost converter 641 boosts the voltage of the DC bus as illustrated. Referring to FIG. 8A, graph 800A (V(red,neutral) is a plot of load voltage across a 40 W lighting load, I(L2) is a plot of a current through the boost inductor L2 (e.g., 691, FIG. 6B); and I(S_P1) is a plot of current through the boost switch, S_P1 (e.g., 695, FIG. 6B). With regard to graph 800B, V(bus) is a plot of voltage on capacitor (e.g., bus capacitor 643 of FIG. 6A). With regard to graph 800C, V(Line-in, Red) is a plot of voltage across Line and switched hot (R) terminals of the ECS 600 of FIG. 6A. Referring to graph 800C, V(red,neutral) is a plot of load voltage across a 40 W lighting load (e.g., 624); I(L2) is a plot of current through boost inductor L2; and I(S_P1) is a plot of current through boost switch, S_P1. Graph 800D, V(bus) is a plot of voltage across the capacitor 643; V(Line-in, Red) is a plot of voltage across Line and switched hot(R) terminals of the ECS 600. Referring to graph 800E, V(red,neutral) is a plot of load voltage across 800 W lighting load; I(L2) is a plot of current through the boost inductor L2; and I(S_P1) is plot of current through boost switch, S_P1. Referring to graph 800F, V(bus) is a plot of voltage across the capacitor 643; and V(Line-in, Red) is a plot of voltage across Line and switched hot(R) terminals of the ECS 600. Referring to graph 800G, V(red,neutral) is a plot of load voltage across 800 W lighting load (e.g., 624); I(L2) is a plot of current through boost inductor L2; and I(S_P1) is a plot of current through boost switch, S_P1. Refering to graph 800H, V(bus) is a plot of voltage across the capacitor 643; and V(Line-in, Red) is a plot of voltage across Line and switched hot(R) terminals of the ECS 600.

Generally with a light load it is seen that the V(bus) voltage value is not higher with boost than it is with the boost converter working. Hence at light load there is no boost operation. However with a heavy load, the V(bus) voltage with boost converter may be much higher than without boost. Hence the boost operation works as expected. This shows the load dependent operation of this topology.

With regard to heavy loads, experimental results are shown with respect to FIG. 8B, which shows graphs 800E through 800H of voltage and current waveforms for embodiments the ECS 600 driving an 800 W load with and without boost. More particularly, graphs 800E and 800F illustrate simulations of the ECS 600 operating without boost; and graphs 800G thorough 800H illustrate simulations of the ECS 600 operating with boost. It is seen that the bus voltage is boosted. This shows that embodiments of the present system may be very load dependent.

Further, with regard to load type, if the load is for example a compact fluorescent light (CFL), then the operation with the phase cut may not always be possible. This may be due to the fact that the CFL lamp may draw current only near peak of the line and thus may require current flow through the whole AC cycle. Accordingly, operation over a whole phase cut range may not be possible with all types of lamps and/or loads. Accordingly, a phase cut range may be controlled in accordance with a lamp or load type, if desired. It is seen that the DC bus voltage may be boosted. This shows that this method may be very load dependent. For example, in this embodiment if the load is CFLi then the operation with the phase cut may not be possible.

A series supply method will now be discussed with reference to isolated and non-isolated embodiments.

FIG. 9A is a schematic of portions of an isolated ECS 900A in accordance with embodiments of the present system. The ECS 900A may be a fully-isolated supply and, thus, may be referred to as an isolated supply and may have ON and OFF states. In the ON state, power is transferred to a load 924 and in the OFF state substantially no power is transferred to the load 924. Accordingly, the ECS 900A may include an OFF converter 901 and an ON converter 905 both of which receive AC power from an AC power source 902. The OFF converter 901 may include a rectifier bridge 906 including diodes 9D3-9D6 and which may receive AC voltage at terminals AC1 and AC2, rectify the AC voltage, and thereafter output a rectified DC voltage across terminals 910+ and 910−. A flyback converter 991 may be coupled to terminals 910+ and 910− of an OFF bus and may generate a low-voltage output Vout across output terminals VI+ and VI− between which an output resistor 940 may be located. More particularly, the flyback converter 991 may include a transformer 916, a primary switch 912, and an output loop 979. The primary switch 912 (e.g., a controllable switch such as a MOSFET, etc.) may be controlled by a controller and may selectively control current flow $I_{91}$ through a primary winding 914 of the transformer 916. The transformer 916 may include a secondary winding 918 coupled in series with a diode 920 and the output resistor 940 and may form part of the output loop 979. A bus capacitor 917 may be coupled across the terminals 910+ and 910− of the OFF bus and may have a capacitance that may be varied depending upon an expected load and/or load type of a load 924 (e.g., incandescent, fluorescent, reactive, inductive, etc.). A controller may control the conductivity of the primary switch 912 such that the primary switch 912 may be controllably turned on (e.g., conduct) and off (e.g., substantially not conduct) to control output voltage Vout across the resistor 940 which in the present example, may be about 5 v DC. As shown by these embodiments, Vout may be used to operate circuitry of the ECS 900A. In yet other embodiments, it is envisioned that the OFF converter 901 may include any suitable flyback converter such as conventional flyback converters and the like which may be modified to operate in accordance with embodiments of the present system.

A switch such as a relay 930 may be coupled in series with the power supply 902 and the ON converter 905 to selectively control power provided by the AC source 902 to the ON converter 905. In accordance with embodiments of the present system, the relay 930 may be controlled by the controller. The On converter 905 may include a controllable rectifier bridge 966 including diodes 9D1 and 9D2 and switches 963 and 965 which may receive AC voltage at terminals AC3 and AC4, rectify this AC voltage, and output the rectified DC voltage across terminals 909+ and 909−. The switches 963 and 965 may include controllable switches having reverse diodes such as may be provided by field-effect transistors (FETs) as will be discussed below. A secondary flyback converter 971 may be similar to the flyback converter 991 and may be coupled to terminals 909+ and 909− to generate Vout across terminals VI+ and VI−. More particularly, the secondary flyback converter 971 may include a transformer 917, a primary switch 913, and a secondary output loop 973 which is coupled in parallel with the output loop 979. The primary switch 913 (e.g., a controllable switch such as a MOSFET, etc.) may be controlled by the controller and may selectively control current flow $I_{71}$ through a primary winding 931 of the transformer 917. The transformer 917 may include a secondary winding 933 coupled in series with a diode 929 of a secondary output loop 973. The secondary output loop 973 may be coupled across the resistor 940 in parallel with the diode 920 and secondary winding 918 such that the resistor 940 may be common to the flyback converters 971 and 991. A bus capacitor 921 may be coupled across the terminals 909+ and 909− and may have a capacitance that may be varied depending upon an expected load and/or load type of the load 924 (e.g., incandescent, fluorescent, etc.). A controller may control the conductivity of the primary switch 913 such that the primary switch 913 may be controllably turned on (e.g., to conduct) and off (e.g., to substantially not conduct) to control output voltage Vout across the resistor 940 which in the present example, will be about 5 VDC.

The load may include a ballast including a resistor 949 and a capacitor 947 may be coupled in series between the AC source 902 and terminals AC2 and AC4 (e.g., which may include a switched hot (R) conductor) With regard to the switches 963 and 965, these may include low-voltage FETs and may operate as diodes when open. However, each of the switches 963 and 965 may be selectively controlled to open or close (e.g., conduct) to couple terminals AC3 and AC4 together so as to couple the line (L) to the switched hot ((R) or red) terminals so as to pass line (L) voltage (e.g., from the AC source 902) directly to the load 924. The relay 930 may be selectively controlled to open (e.g., substantially not conduct) and to protect the switches 963 and 965 when the primary switch 913 is off (e.g., open or substantially non-conducting). When the switches 963 and 965 are off (e.g., substantially not conducting), the reverse diodes along with the diodes 9D1 and 9D2 of the rectifier bridge 966 will rectify AC signals received from the line (L) and charge the bus capacitor 921 (i.e., the ON-bus capacitor). The voltage across capacitor 921 (i.e., the ON bus voltage) can, thus, be regulated to desired value by, for example, the controller such that it is very low and may be controlled to be just high enough to operate the ON-converter. Accordingly, the controller may compare the ON bus voltage with one or more threshold voltages and may control accordingly.

With regard to the main switch S1, when the ECS 900A is in an OFF state (i.e., an ECS is not powering the load) it may be open (e.g., non-conducting) and the OFF converter 901 may be operative to provide Vout for driving low-voltage components of the ECS 900A. In this mode, the ON converter 905 is substantially inactive. However, when the ECS is in an ON state (e.g., when driving a load), the main switch S1 may be on (e.g., closed or substantially conducting) and may couple the line (L) to the terminal AC3.

An ECS with a non-isolated supply may be constructed in accordance with embodiments of the present system that is essentially similar to the isolated ECS 900A. However, for the non-isolate ECS, the ON-Bus may be directly coupled to a DC voltage source (e.g., Vdd) such as a 5V supply, although other values are also envisioned. The isolated and non-isolated ECSs can operate over a complete AC cycle or cycles.

FIG. 9B is a schematic of portions of a non-isolated ECS 900B in accordance with embodiments of the present system. ECS 900B is not isolated from the ON converter and thus, may be referred to as a non-isolated supply and is similar to the ECS 900A with several modifications. More particularly, the ECS 900B may be formed by modifying the ECS 900A such that nodes NF and NFF are electronically coupled together and nodes and nodes NG and NGG are electronically coupled together with elements between the coupled nodes removed for the sake of clarity (e.g., FIGS. 9A and 9B). Accordingly, in the ECS 900B, the on-flyback converter of the ECS 900A may be removed and line voltage at node NF may be directly coupled to the +5V supply obtained through the rectifier bridge 966.

FIGS. 10A through 10F illustrate signal waveforms of these ECSs. More particularly, FIG. 10A shows a graph 1000A illustrative of voltage and current waveforms for a non-isolated flyback converter in accordance with embodiments of the present system. FIG. 10B shows a graph 1000B illustrative of voltage and current waveforms for the non-isolated flyback converter. Graph 1000A shows waveforms for the non-isolated flyback converter driving a 40 W (incandescent load and providing a 1 watt low-voltage power at low-voltage output. Similarly, in graph 1000B, the flyback converter is driving an 800 watt load and providing a 1 watt low-voltage output.

FIG. 10C shows a graph 1000C illustrative of voltage and current waveforms for the isolated flyback converter and FIG. 10D shows a graph 1000C illustrative of voltage and current waveforms for the isolated flyback converter of FIG. 9. Graph 1000C shows waveforms for the isolated flyback converter 900A driving a 40 W (incandescent) load and providing a 1 watt low voltage output. Similarly, in graph 1000D, the isolated flyback converter 900A is driving an 800 watt load and providing a 1 watt low voltage output.

FIG. 10E shows a graph 1000E illustrative of voltage and current waveforms for the non-isolated flyback converter of FIG. 9A and FIG. 10F shows a graph 1000F illustrative of voltage and current waveforms for an isolated flyback converter. With reference to graph 1000E, waveforms for the non-isolated flyback converter driving a 23 W CFLi load and providing a 1 watt low-voltage output are shown. Similarly, in graph 1000F, the isolated flyback converter 900A is driving a 23 W CFLi load and providing a 1 watt low-voltage output.

With regard to graphs 1000A through 1000F, the waveforms illustrate that voltage distortions decrease as the low-voltage bus voltage (e.g., Vbus) across terminals 909+ and 909− (e.g., across capacitor 921) decreases. At lighter lamp loads, voltage distortion may increase. However, lower internal power draw (e.g., of the ECS) may reduce distortion. The voltage ripple is higher at lighter lamp loads. Further, embodiments of the flyback transformer of the present system are also capable of operating with non-PF corrected lamps such as CFL and light emitting diode (LED) lamps which may have different minimum load requirements as shown in FIGS. 10E and 10F.

Switch losses for the switches (e.g., the MOSFETs) 963 and 965 for embodiments of both the isolated and the non-isolated ECSs are shown below with reference to Tables 2 and 3. Further, the term "EWS" may refer to ECSs in accordance with embodiments of the present system.

TABLE 2

Isolated

| Load power, W | EWS power, mW | DC bus voltage, avg V | DC bus voltage, min V | Switch power loss, mW |
|---|---|---|---|---|
| 40 | 1000 | 15 | 14.60 | 19 |
| 40 | 500 | 15 | 14.75 | 8 |
| 40 | 250 | 15 | 14.74 | 6 |
| 800 | 1000 | 15 | 14.65 | 174 |
| 800 | 500 | 15 | 14.75 | 164 |
| 800 | 250 | 15 | 14.75 | 160 |
| 1300 | 1000 | 15 | 14.64 | 421 |
| 1300 | 500 | 15 | 14.75 | 411 |
| 1300 | 250 | 15 | 14.75 | 407 |

TABLE 3

Non-Isolated

| Load power, W | EWS power, mW | DC bus voltage, avg | DC bus voltage, min | Switch power loss, mW |
|---|---|---|---|---|
| 40 | 1000 | 5.5 | 5.06 | 48 |
| 40 | 500 | 5.5 | 5.25 | 22 |
| 40 | 250 | 5.5 | 5.25 | 12 |
| 800 | 1000 | 5.5 | 5.25 | 204 |
| 800 | 500 | 5.5 | 5.22 | 180 |
| 800 | 250 | 5.5 | 5.25 | 164 |
| 1300 | 1000 | 5.5 | 5.25 | 451 |
| 1300 | 500 | 5.5 | 5.25 | 423 |
| 1300 | 250 | 5.5 | 5.25 | 411 |

With regard to minimum loads for the ECSs shown in FIG. 9A, it has been determined that the isolated ECS (e.g., 900A) in accordance with embodiments of the present system may require a minimum load of about 24 W while the non-isolated ECS may require a minimum load of 56 W. However, it has been found that the non-isolated ECS may have a worst case drop of about 6% in load voltage (V-load) while the isolated ECS have a worst case drop of 14% in load voltage. These results are shown in Tables 4 and 5 below for the isolated and non-isolated ECSs, respectively.

TABLE 4

Isolated

| EWS power, mW | Min. Load power(108 V), W | Min. Load power(305 V), W |
|---|---|---|
| 1000 | 9.6 | 24 |
| 500 | 4.8 | 12 |
| 250 | 2.4 | 6 |

TABLE 5

Non-Isolated

| EWS power, mW | Min. Load power(108 V), W | Min. Load power(305 V), W |
|---|---|---|
| 1000 | 21 | 56 |
| 500 | 10.1 | 28 |
| 250 | 5.1 | 14 |

Tables 6 and 7 illustrate output (load) distortion for various loads and DC ON bus or OF bus values. It is seen that the isolated ECS may require higher DC bus voltages than required by equivalent non-isolated ECSs. The higher DC bus voltages may contribute to a higher distortion in the line (L) voltage as indicated by the output voltage distortion (VTHD). This may also result in a higher voltage across the ECS. Further, higher DC bus voltages (in the ON bus) in the ON-converter may require higher voltage FETs and lead to higher power losses in these devices as a result of higher on resistance that the higher voltage FETs may experience.

TABLE 6

Isolated Suppy

| Load power, W | EWS power, mW | DC bus voltage, avg | Output voltage distortion, VTHD % |
|---|---|---|---|
| 40 | 1000 | 15 | 7.08 |
| 40 | 500 | 15 | 5.39 |
| 40 | 250 | 15 | 3.49 |
| 1300 | 1000 | 15 | 3.46 |
| 1300 | 250 | 15 | 2.00 |

TABLE 7

Non-Isolated Supply

| Load power, W | EWS power, mW | DC bus voltage, avg | Output voltage distortion, VTHD % |
|---|---|---|---|
| 40 | 225 | 5.9 | 2.74 |
| 40 | 1000 | 5.5 | 3.92 |
| 40 | 500 | 5.5 | 3.66 |
| 40 | 250 | 5.5 | 2.27 |

TABLE 7-continued

Non-Isolated Supply

| Load power, W | EWS power, mW | DC bus voltage, avg | Output voltage distortion, VTHD % |
|---|---|---|---|
| 1300 | 1000 | 5.5 | 1.33 |
| 1300 | 250 | 5.5 | 0.11 |

FIG. 11 shows a portion of an OFF converter 1100 corresponding to the OFF converter 901 of FIG. 9A in accordance with embodiments of the present system. The OFF converter 1100 may include any suitable flyback converter that may deliver a low-voltage output power of about 1.0 W. In accordance with embodiments of the present system, an important consideration is the ability to startup under load. Table 8 below illustrates experimental results for various loads for an ECS including the OFF converter 1100 in accordance with embodiments of the present system. Although several loads types are shown, other load types are also envisioned. Further, in Table 8 the data is obtained using a low line (L) voltage of 108V. In accordance with embodiments of the present system, a worst case condition for the present supply was determined to be the low-line voltage of 108V (−10% of 120V). Accordingly, test results for this voltage may be illustrated.

TABLE 8

| ECS Switch load | Load on 5 V supply, ohms | Power delivered by 5 V supply, mW(load) | Current delivered by 5 V supply, mA |
|---|---|---|---|
| No load, direct supply to flyback converter | 33 | 750 | 150 |
| 40 W incandescent bulb | 33 | 750 | 150 |
| Ielectronic fluo ballast | 500 | 50 | 10 |
| fluo ballast with parallel 470 nF | 82 | 300 | 60 |
| dimming electronic, TRIAC | 5000 | 5 | 1 |
| with parallel 470 nF | 100 | 250 | 50 |
| 16 W, edison base | 100 | 250 | 50 |
| 16 W with parallel 470 nF | 50 | 500 | 100 |
| 16 W, non-dimming | 5000 | 5 | 1 |
| 16 W with parallel 470 nF | 82 | 300 | 60 |
| Fan load | 33 | 750 | 150 |
| magnetic fluo ballast | 24 | 1000 | 200 |

FIG. 12A shows graphs 1200A and 1200B of startup waveforms corresponding to ECSs driving the switch loads shown in Table 8 in accordance with embodiments of the present system; and FIG. 12B shows graphs 1200C and 1200D corresponding to ECSs driving the switch loads shown in Table 8 in accordance with embodiments of the present system. More particularly, startup waveforms for the 40 W incandescent bulb, the electronic ballast, 50 mW load, electronic ballast with 470 nF across the ballast, and the CFL, 16 W load, are shown in graphs 1200A, 1200B, 1200C, 1200D, respectively.

FIG. 13 shows a portion of an ON converter 1300 corresponding to the isolated supply 900A of FIG. 9A in accordance with embodiments of the present system. The ON converter 1300 may include a controllable rectification bridge 1366 which is similar to the rectification bridge 966 of FIG. 9A and includes two diodes 13D1 and 13D2 and two MOSFETs (hereinafter FETs), 1363 (Q10) and 1365 (Q11). The FETs (1363, 1365) are normally in an OFF state which causes current in the ON-bus (e.g., a load current (Idon)) to flow through the bus caps 1317-1 (C11) and 1317-2 (C14). When the FETs (1363, 1365) are on (and therefore in a conducting state), the load current in the ON-bus is bypassed to the load. A comparator circuit 1377 (or other logic device such as a controller, a logic gate, etc.) senses the ON bus voltage and controls the switching of the FETs (1363, 1365) to achieve the desired ON bus voltage. The flyback converter 1371 after 1317-1 (C11) and 1317-2 (C14) may be used to provide isolation of an output voltage (e.g., a 5V supply) at terminal 1380. The flyback converter 1371 may include a transformer 1331. A primary switch of the primary converter 1371 may be included in 1387 (U4) The ON converter 1300 is operated when the relay 1383 (e.g., see, S1) is closed and therefore conducts power from the line (L) to the ON bus. The operation of the ON converter 1300 is dependent being that the load current (e.g., see, load ballast FIG. 9A) in the ON bus charges up the bus caps (1317-1, 1317-2). On or more opto-sensors 1385 provide isolated feedback information related to characteristics (e.g., current and/or voltage) of the output voltage to a logic device which can then trigger a primary switch of the flyback converter 1371 to conduct such that a current flows through a primary 1314 coil of the transformer 1331.

The startup is verified for this converter in the non-isolated configuration. The flyback converter is disabled and only a voltage across the capacitor 1317-1 is determined and compared with a threshold voltage. This comparison may made to determine whether the topology will start with higher load currents during a power-on condition, if desired. The loads shown below are determined for a low line (L) voltage of 108V. The max load with which startup was obtained and is recorded below.

Table 9 below illustrates experimental results for various loads powered by an ECSs including the ON converter shown in FIG. 13 in accordance with embodiments of the present system. It is also envisioned that other types of loads may also be driven. Further, in Table 9 the data was obtained using a low line (L) voltage of 108V.

TABLE 9

| EWS Switch load | Load on 5 V supply, ohms | Power delivered by 5 V supply, mW(load) | Current delivered by 5 V supply, mA |
|---|---|---|---|
| 40 W incandescent bulb | 20.25 | 1200 | 240 |
| electronic ballast | 21.8 | 1100 | 220 |
| 16 W, edison base | 28 | 900 | 180 |
| Fan load | 33.8 | 750 | 150 |
| magnetic fluo ballast | 28 | 900 | 180 |

FIG. 14A shows graphs 1400A and 1400B of startup waveforms for the ECSs described in Table 9 in accordance with embodiments of the present system; and FIG. 14B shows graphs 1400C and 1400D of startup waveforms for the ECSs shown in Table 14 in accordance with embodiments of the present system. More particularly, startup waveforms for the 40 W incandescent bulb (1200 mW load), the electronic ballast (1100 mW load), the CFL, 16 W (900 mW load), and the Fan (750 mW load) are shown in graphs 1400A, 1400B, 1400C, 1400D, respectively. The waveforms show an input current (Idon) and MOSFET (1363 (Q10) and 1365 (Q11)) gate voltage.

FIG. 15 shows graphs 1500A and 1500B of transitions from the OFF converter to the ON converter and back for the ECS load combinations described in Table 9 in accordance with embodiments of the present system. It is seen that the 5V (output) supply is maintained above 5V ensuring a stable supply of low-voltage power for low-voltage circuits of the ECS. More particularly, graph 1500A shows a transition from OFF to ON converters using a 40 W incandescent lamp as a load, and graph 1500B shows a transition from ON to OFF converters using a 40 W incandescent lamp as a load. Waveforms of the input current signal (e.g., AC input), the low voltage output (5V supply), and a relay control signal (e.g., a relay drive signal) for controlling main switch (e.g., the relay S1) are shown.

Accordingly, the present system provides a digitally-controlled neutral-less dimmer/switch including a low-voltage power supply suitable for driving low-voltage circuits of the dimmer/switch. The neutral-less dimmer in accordance with embodiments of the present system, may be coupled to only a line (L) and switched hot (R) conductors and do not need to be coupled to a neutral (N) wire to operate correctly. Further, an internal low-voltage power supply deliver low-voltage at a desired voltage regardless of operative state (e.g. whether ON or OFF). Isolation may be provided while generating sufficient power for operation of a wireless transceiver portion which may transmit and/or receive information for operation. Accordingly, for example, a user may wirelessly transmit ON and/or OFF commands to the ECS.

The present system may further be incorporated into three-wire dimmers such as a conventional Electronic Wireless Switch (EWS) which may include line (L) and neutral (N) connections as inputs. The EWS may be field programmable using a connector such as a USB connector. During programming or repair, one or more low-voltage (LV) boards may be taken out from the EWS. The field programmability enables software upgrades, feature changes, and/or trouble shooting operations to be performed. However, when an LV board is removed, in some embodiments a supply (e.g., line (L)) connector may be exposed and may present a shock hazard. Accordingly, the present system provides a system and method to generate a stable supply which is isolated for a two-wire neutral-less switch/dimmer.

Accordingly, the present system may be incorporated into existing ECSs to provide isolation. This isolation may provide for easy and safe field programming and trouble-shooting. Further, remote control applications (e.g., using wired and/or wireless transmission methods) are also envisioned to operate, troubleshoot, and/or program ECSs in accordance with embodiments of the present system.

FIG. 16 shows a portion of a system 1600 (e.g., peer, server, etc.) in accordance with embodiments of the present system. For example, a portion of the present system may include a processor 1610 operationally coupled to one or more of a memory 1620, a rendering device (e.g., a display, a speaker, light emitting diodes (LED), etc.) 1630, sensors 1660, outputs 1640 (e.g., SM, DIM, etc.), and a user input device 1670. The memory 1620 may be any type of device for storing application data as well as other data related to the described operation. The sensors 1660 may include one or more of amplitude and/or phase sensors such as a zero-crossing sensor which may provide information (e.g., ZCI) related to characteristics such as amplitude, waveform, and/or phase of line (L) voltage, internal, and/or load voltage waveforms. The application data and other data are received by the processor 1610 for configuring (e.g., programming) the processor 1610 to perform operation acts in accordance with the present system. The processor 1610 so configured becomes a special purpose machine particularly suited for performing in accordance with the present system.

The operation acts may include controlling operation of an ECS (e.g., a dimmer or switch). The user input device 1670 may receive an operative command such as a ON, OFF and/or dimming selection from a user or a central controller (e.g., via a wired or wireless receiver). The user input device 1670 may include, for example, a switch, a touchpad, a keyboard, or other device, including touch sensitive displays, which may be stand alone or be a part of a system, such as part of a dimmer, a light unit, or other device for communicating with the processor 1610 via any operable link. The user input device 1670 may be operable for interacting with the user and/or the processor 1610 including enabling interaction within a UI as described herein. The processor 1610 may also receive a dimming selection via any operable link such as a wireless lighting control link. Clearly the processor 1610, the memory 1620, display 1630 and/or user input device 1670 may all or partly be a portion of a computer system or other device.

The methods of the present system are particularly suited to be carried out by a computer software program, such program containing modules corresponding to one or more of the individual steps or acts described and/or envisioned by the present system. Such program may of course be embodied in a computer-readable medium, such as an integrated chip, a peripheral device or memory, such as the memory 1620 or other memory coupled to the processor 1610.

The program and/or program portions contained in the memory 1620 configure the processor 1610 to implement the methods, operational acts, and functions disclosed herein. The memory 1620 may be distributed, for example between the clients and/or servers, or local, and the processor 1610, where additional processors may be provided, may also be distributed or may be singular. Moreover, the term "memory" should be construed broadly enough to encompass any information able to be read from or written to an address in an addressable space accessible by the processor 1610. With this definition, information accessible through a network is still within the memory 1620, for instance, because the processor 1610 may retrieve the information from the network for operation in accordance with embodiments of the present system.

The processor 1610 is operable for providing control signals and/or performing operations in response to input signals from the user input device 1670, the sensors 1660, as well as in response to other devices of a network (e.g., a central or distributed lighting controller, etc.) and executing instructions stored in the memory 1620. The processor 1610 may be an application-specific or general-use integrated circuit(s). Further, the processor 1610 may be a dedicated processor for performing in accordance with the present system or may be a general-purpose processor wherein only one of many functions operates for performing in accordance with the present system. The processor 1610 may operate utilizing a program portion, multiple program segments, or may be a hardware device utilizing a dedicated or multi-purpose integrated circuit. Further variations of the present system would readily occur to a person of ordinary skill in the art and are encompassed by the following claims.

Finally, the above-discussion is intended to be merely illustrative of the present system and should not be construed as limiting the appended claims to any particular embodiment or group of embodiments. Thus, while the present system has been described with reference to exemplary embodiments, it should also be appreciated that numerous modifications and alternative embodiments may be devised by those having ordinary skill in the art without departing from the broader and intended spirit and scope of the present system as set forth in the claims that follow. In addition, the section headings included herein are intended to facilitate a review but are not intended to limit the scope of the present system. Accordingly, the specification and drawings are to be regarded in an illustrative manner and are not intended to limit the scope of the appended claims.

In interpreting the appended claims, it should be understood that:

a) the word "comprising" does not exclude the presence of other elements or acts than those listed in a given claim;

b) the word "a" or "an" preceding an element does not exclude the presence of a plurality of such elements;

c) any reference signs in the claims do not limit their scope;

d) several "means" may be represented by the same item or hardware or software implemented structure or function;

e) any of the disclosed elements may be comprised of hardware portions (e.g., including discrete and integrated electronic circuitry), software portions (e.g., computer programming), and any combination thereof;

f) hardware portions may be comprised of one or both of analog and digital portions;

g) any of the disclosed devices or portions thereof may be combined together or separated into further portions unless specifically stated otherwise;

h) no specific sequence of acts or steps is intended to be required unless specifically indicated; and i) the term "plurality of" an element includes two or more of the claimed element, and does not imply any particular range of number of elements; that is, a plurality of elements may be as few as two elements, and may include an immeasurable number of elements.

What is claimed is:

1. An electronically controlled switch (ECS) apparatus) adapted to be coupled to an alternating current (AC) source) and to a load so as to control an amount of power delivered from the AC source to the load, the ECS having ON and OFF states and comprising:

a first power supply having a first direct current (DC) bus electronically coupled to a rectifier bridge and a first flyback converter, the rectifier bridge configured to receive an AC signal from the AC source and provide a first DC voltage at the first DC bus, the first flyback converter configured to receive the DC voltage and output a first low-voltage signal;

a second power supply having a second direct current (DC) bus electronically coupled to a controllable rectifier bridge and a second flyback converter, the controllable rectifier bridge is configured to receive the AC signal from the AC source and provide a second DC voltage at the second DC bus, the second flyback converter configured to receive the second DC voltage and output a second low-voltage signal; and a control portion configured to control the first flyback converter to output the first low-voltage signal when the ECS is in the OFF state, and further configured to control the second flyback converter to output the second low-voltage signal when the ECS is in the ON state, wherein the ECS is configured to use the first or second low voltage for internal operating power.

2. The apparatus of claim 1, wherein the switch apparatus is a neutral-less switch which is coupled to only two external conductors, the two external conductors comprising a line (L) conductor and a switched line (R) conductor.

3. The apparatus of claim 1, wherein when the ECS is in the OFF state, substantially no AC power is delivered to the load, and when the ECS is in the ON state, the second power supply is controlled by the controller to control the amount of power delivered from the AC source to the load.

4. The apparatus of claim 1, wherein the controllable rectifier bridge comprises a first diode and a first metal-oxide field-effect transistor (MOSFET) in series connection, and a second diode and a second MOSFET in series connection.

5. The apparatus of claim 4, wherein when the ECS is in the ON state, the controller is configured to control one or more of the first and second MOSFETs of the controllable rectifier bridge to conduct.

6. The apparatus of claim 4, wherein the controller selectively controls one or more of the first and second MOSFETS of the controllable rectifier bridge to conduct so as to control an amount of power delivered from the AC source to the second direct current (DC) bus.

7. The apparatus of claim 1, further comprising a wireless receiver which operates using the first low-voltage signal when the ECS is in an OFF state and the second low-voltage signal when the ECS is in an ON state.

8. A low-voltage power supply apparatus for providing power to an electronically controlled switch (ECS), the ECS adapted to be coupled to an alternating current (AC) source and to a load so as to control an amount of power delivered from the AC source to the load, ECS having an ON and OFF states, the low-voltage power supply comprising:
a first power supply having a first direct current (DC) bus electronically coupled to a rectifier bridge and a first flyback converter, the rectifier bridge is configured to receive an AC signal from the AC source and provide a first DC voltage at the first DC bus, the first flyback converter is configured to receive the DC voltage and output a first low-voltage signal;
a second power supply having a second direct current (DC) bus electronically coupled to a controllable rectifier bridge and a second flyback converter, the controllable rectifier bridge is configured to receive the AC signal from the AC source and provide a second DC voltage at the second DC bus, the second flyback converter configured to receive the second DC voltage and output a second low-voltage signal; and
a controller is configured to control the first flyback converter to output the first low-voltage signal when the ECS is in the OFF state, and is further configured to control the second flyback converter to output the second low-voltage signal when the ECS is in the ON state, wherein the ECS is configured to use the first or second low voltage signals for internal operating power.

9. The apparatus of claim 8, wherein the ECS is a "neutral-less" switch which is coupled to only two external conductors, the two external conductors comprising a line (L) conductor and a switched line (R) conductor.

10. The apparatus of claim 8, wherein when the ECS is in the OFF state, substantially no AC power is delivered to the load, and when the ECS is in the ON state, the second power supply is controlled by the controller to control the amount of power delivered from the AC source to the second direct current (DC) bus.

11. The apparatus of claim 8, wherein the controllable rectifier bridge comprises a first diode and a first metal-oxide field-effect transistor (MOSFET) in series connection, and a second diode and a second MOSFET in series connection.

12. The apparatus of claim 11, wherein when the ECS is in the ON state, the controller is configured to control one or more of the first and second MOSFETs of the controllable rectifier bridge to conduct.

13. The apparatus of claim 11, wherein the controller selectively controls one or more of the first and second MOSFETS of the controllable rectifier bridge to conduct so as to control an amount of power delivered from the AC source to the second direct current (DC) bus.

14. The apparatus of claim 8, further comprising a wireless receiver coupled to the first and second power supplies and which operates using the first low-voltage signal when the ECS is in an OFF state and the second low-voltage signal when the ECS is in an ON state.

* * * * *